US012354863B2

(12) United States Patent
Hasegawa et al.

(10) Patent No.: US 12,354,863 B2
(45) Date of Patent: Jul. 8, 2025

(54) ION SOURCE, MASS SPECTROMETER, ION SOURCE CONTROL METHOD

(71) Applicant: Hitachi High-Tech Corporation, Tokyo (JP)

(72) Inventors: Hideki Hasegawa, Tokyo (JP); Masuyuki Sugiyama, Tokyo (JP); Yuichiro Hashimoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 496 days.

(21) Appl. No.: 17/802,912

(22) PCT Filed: Dec. 4, 2020

(86) PCT No.: PCT/JP2020/045196
§ 371 (c)(1),
(2) Date: Aug. 26, 2022

(87) PCT Pub. No.: WO2021/171725
PCT Pub. Date: Sep. 2, 2021

(65) Prior Publication Data
US 2023/0141083 A1    May 11, 2023

(30) Foreign Application Priority Data

Feb. 27, 2020   (JP) ................. 2020-031179

(51) Int. Cl.
*H01J 49/16*      (2006.01)
*G01N 30/72*     (2006.01)
*H01J 49/04*     (2006.01)

(52) U.S. Cl.
CPC ........ *H01J 49/167* (2013.01); *G01N 30/7266* (2013.01); *H01J 49/0404* (2013.01)

(58) Field of Classification Search
CPC .......... H01J 49/00; H01J 49/02; H01J 49/167; H01J 49/0404; H01J 49/165; G01N 30/7266
(Continued)

(56) References Cited

U.S. PATENT DOCUMENTS 5,545,304 A * 8/1996 Smith .................. H01J 49/025
204/603
5,969,351 A * 10/1999 Nabeshima ........... H01J 49/168
250/288
2016/0370273 A1  12/2016 Pieterse et al.

FOREIGN PATENT DOCUMENTS

JP       2008-021455 A     1/2008

OTHER PUBLICATIONS

European Patent Office, Extended European Search Report, Application No. 20921204.2, dated Mar. 12, 2024, in 9 pages.

* cited by examiner

*Primary Examiner* — Jason L McCormack
(74) *Attorney, Agent, or Firm* — PROCOPIO, CORY, HARGREAVES & SAVITCH LLP

(57) ABSTRACT

There are provided an ion source that can accurately and efficiently grasp whether a tip end position on a capillary downstream side is proper and a control method therefor. An ion source according to an embodiment of the present invention measures an electric current generated due to the application of a voltage to a capillary by a power supply when a sample is not introduced into the capillary. When the electric current is within tolerance, the ion source outputs projection amount information expressing that the projection amount of the capillary is proper, and the ion source outputs the projection amount information expressing that the projection amount is improper when the projection amount is not within the tolerance.

13 Claims, 24 Drawing Sheets

(58) Field of Classification Search
USPC .......................................... 250/281, 282, 288
See application file for complete search history.

ION SOURCE, MASS SPECTROMETER, ION SOURCE CONTROL METHOD

TECHNICAL FIELD

The present invention relates to an ion source that ionizes a sample.

BACKGROUND ART

Electrospraying (in the following, referred to as "ESI method"), which is a typical ionization method for use in mass spectrometric analysis and the like, is a method in which a sample liquid solution is introduced from the upstream end of a capillary and ions or droplets are sprayed from a downstream end using an electric field and the like. In order to improve ionization efficiency, in some cases, a gas spray pipe is disposed on the outer side of a capillary to spray a gas or a heated gas is sprayed to ions or droplets sprayed from the capillary.

Since the inner diameter of the capillary is a considerably small diameter, this is highly likely to cause clogging, and thus the capillary has to be frequently exchanged depending on types, use conditions, or the like of a sample liquid solution. However, the capillary exchange operation of conventional ESI ion source is complicated, and the reproducibility of the position of the downstream end of the capillary after exchanged affects the reproducibility of the detection sensitivity. This is because the position of the downstream end of the capillary with respect to the ion inlet port of a mass spectrometer greatly affects detection sensitivity.

Patent Literature 1 below describes a technique that adjusts the position of the downstream end of a capillary. In this literature, a capillary is secured to a joint in advance to integrate those members, the joint is rotated and screwed into a manifold, so that the capillary is movable in the longitudinal direction (the position of the downstream end of the capillary can be adjusted in a state in which the capillary is installed in a housing) (see Abstract of the present literature).

CITATION LIST

Patent Literature

Patent Literature 1: Japanese Unexamined Patent Application Publication No. 2008-021455

SUMMARY OF INVENTION

Technical Problem

The method described in Patent Literature 1 is the technique that is suited to optimizing a position while observing the sensitivity of ions produced by actual flowing of a sample liquid solution. This technique is not possible to determine whether the position is optimum before producing ions. As a result, a reduction in throughput or a loss of a sample occurs.

Moreover, in a case in which a capillary is exchanged by taking out and putting in, a possibility may be thought that the capillary is caught at the part in the midway point (e.g., in the inside of a gas spray pipe) at the time of insertion because the capillary has a small diameter and the downstream end of the capillary does not reach a desired position (e.g., at a position at which the downstream end of the capillary slightly projects from the downstream end of a gas spray pipe). When a sample liquid solution is delivered in this state, the inside of the gas spray pipe is soaked, which might be a cause of a trouble for contamination or failure of the analyzer.

Although the degree of projection of the capillary can be visually confirmed to some extent, the position resolution which can be visually obtained is limited. A method is also considered in which a camera, sensor, or the like is disposed and the position of the downstream end of the capillary is managed. However, such method leads to an increase in size and complication of the analyzer. Moreover, in the ESI ion source, ions or droplets sprayed from the downstream end of the capillary are heated with a heated gas and the like in order to improve ionization efficiency. Thus, since the temperature of the surrounding of the ion source becomes high temperature, disposing a camera or a sensor near the ion source is not realistic.

The present invention is made in view of the problems described above, and an object of the present invention is to provide an ion source and a control method therefor that can accurately and efficiently identify whether a tip end position on a capillary downstream side is proper.

Solution to Problem

The ion source according to the present invention measures an electric current generated due to the application of a voltage to a capillary by a power supply when a sample is not introduced into the capillary. When the electric current is within an acceptable range, the ion source outputs projection amount information expressing that the projection amount of the capillary is proper, and the ion source outputs the projection amount information expressing that the projection amount is improper when the projection amount is not within the acceptable range.

Advantageous Effects of Invention

In accordance with the ion source according to the present invention, it is possible to accurately and efficiently identify whether the tip end position on the capillary downstream side is proper with no degradation in analysis throughput. Accordingly, the reproducibility of the capillary tip end position is improved, and it is possible to achieve high analysis reproducibility.

DESCRIPTION OF EMBODIMENTS

First Embodiment

Figure 1:
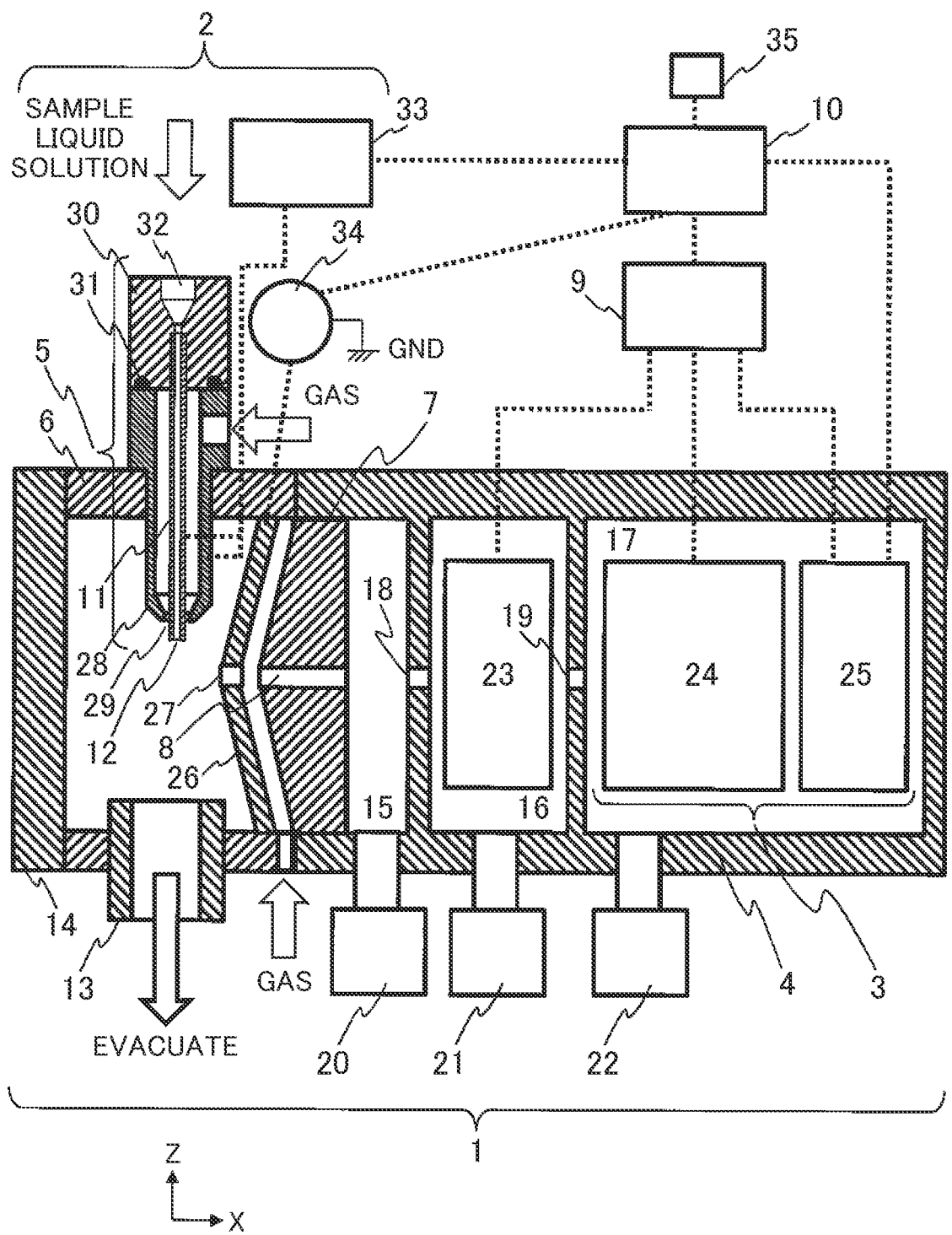
FIG. 1 is a configuration diagram of a mass spectrometer 1 according to a first embodiment.

FIG. 1 is a configuration diagram of a mass spectrometer 1 according to a first embodiment of the present invention. The mass spectrometer 1 includes an ion source 2, a vacuum chamber 4, and the like. The vacuum chamber 4 has a mass spectrometric analyzer 3 and the like in the inside of the vacuum chamber 4. The ion source 2 is mainly formed of an ion producer 5 and an ion source chamber 6.

Ions produced by the ion source 2 are introduced from a hole 8 of a leading-in electrode 7 into the vacuum chamber 4, and are analyzed by the mass spectrometric analyzer 3. To the mass spectrometric analyzer 3, various voltages are applied from a power supply 9. The timing of applying a voltage by the power supply 9 and voltage values thereof are controlled by a controller 10 (computation unit). In addition to these, the controller 10 can also control components included in the ion source 2 or components included in the mass spectrometer 1.

In the ion producer 5, a sample liquid solution is introduced into a capillary 11, and ions or droplets are sprayed from a downstream end 12 of the capillary 11 by an electric field and the like. The voltage value to be applied to the capillary 11 is typically about a few kV (absolute value). In a case in which positive ions are produced, a voltage of a few positive kV is applied to the capillary 11. In a case in which negative ions are produced, a voltage of a few negative kV is applied to the capillary 11. Although the flow rate of the sample liquid solution depends on the inner diameter of the capillary 11, generally, the flow rate is set in the range of order of nL/min to mL/min. Although depending on the conditions for the flow rate of the sample liquid solution and the like, the inner and outer diameters of the capillary 11 are both set to about one millimeter or less.

In order not to leak, to the outside of the analyzer, droplets that are not introduced into the vacuum chamber 4 or components that are made of vaporized droplets, in some cases, the area between the ion source chamber 6 and the vacuum chamber 4 is set to a sealed state (or a state close to a sealed state). Furthermore, an air outlet port 13 may be provided, which evacuates these extra components and the like. In order to observe the spray state of the downstream end 12 of the capillary 11, a window 14 may be provided, which is formed of a transparent member such as glass, on a part of the ion source chamber 6.

As shown in FIG. 1, the inside of the vacuum chamber 4 is sometimes partitioned by a plurality of vacuum chambers 15, 16, and 17. The vacuum chambers are connected through holes 18 and 19 having a small diameter. The hole 8 of the leading-in electrode 7 and these holes 18 and 19 are paths for ions, and a voltage may be applied to the members having these holes. In this case, these members have to be insulated from a housing such as the vacuum chamber 4 through an insulator (not shown). The number of the vacuum chambers may be larger or smaller than the number in FIG. 1.

The vacuum chambers 15, 16, and 17 are generally evacuated with vacuum pumps 20, 21, and 22, and maintained at about a few hundreds Pa, about a few Pa, and 0.1 Pa or less, respectively. In the vacuum chamber 16, an ion transport unit 23 that transmits ions while converging ions is provided. As the ion transport unit 23, a multipole electrode, an electrostatic lens, or the like may be used. In some cases, the ion transport unit 23 is disposed in other vacuum chambers such as the vacuum chamber 15 or 17, or the like. To the ion transport unit 23, a radio frequency voltage, a direct current voltage, an ac voltage, and the like, and in addition to these voltages, a voltage combining these voltages and the like are applied.

The mass spectrometric analyzer 3 is formed of an ion analyzer 24, a detector 25, or the like. The ion analyzer 24 separates or dissociates ions. As the ion analyzer 24, an ion trap, quadrupole filter electrode, collision cell, time-of-flight mass spectrometer (TOF), and the like, and in addition to these, a configuration combining these devices and the like can be used. Ions passing through the ion analyzer 24 are detected by the detector 25. As the detector 25, an electron multiplier, a multichannel plate (MCP), and the like can be used. The ions detected by the detector 25 are converted into electrical signals and the like, and the controller 10 analyzes in detail information on the mass or strength of the ions using these electrical signals. The controller 10 includes an input-output unit that accepts an instruction input from a user and that controls the voltage and the like, and also includes a memory and the like. The controller 10 also has software necessary to operate the power supply. As the voltage to be supplied from the power supply 9 to the mass spectrometric analyzer 3, a radio frequency voltage, a direct current voltage, an ac voltage, and the like can be used, and in addition to these, a voltage combining these voltages and the like can be used.

In the configuration of FIG. 1, a counter electrode 26 is disposed in the previous stage of the leading-in electrode 7. A gas is carried between the leading-in electrode 7 and the counter electrode 26 to spray the gas from a hole 27 of the counter electrode 26, and thus it is possible to suppress the entrance of noise components such as excess droplets and the like sprayed from the downstream end 12 of the capillary 11 into the hole 8 of the leading-in electrode 7. Generally, the flow rate of the gas is set to about 0.5 to 10 L/min, and an inert gas such as nitrogen or argon is used. Generally, the diameter of the hole 27 of the counter electrode 26 is 1 mm or more, and the applied voltage is about a few positive or negative kV at the maximum.

In the configuration of FIG. 1, the gas spray pipe 28 is disposed around the capillary 11, a gas is carried between the capillary 11 and the gas spray pipe 28, and sprayed from the downstream end 29 of the gas spray pipe 28. Accordingly, the vaporization of the droplets sprayed from the downstream end 12 of the capillary 11 is promoted, and it is possible to improve ionization efficiency. Generally, the flow rate of the gas is set to about 0.5 to 10 L/min, and an inert gas such as nitrogen or argon is used. Generally, the inner diameter of the downstream end 29 of the gas spray pipe 28 is set to about one millimeter or less.

In order to further improve ionization efficiency, the space in which ions or droplets are sprayed from the downstream end 12 of the capillary 11 may be heated with a heated gas (at a temperature of about 800° C. at the maximum) (not shown). Generally, the flow rate of the heated gas is set to about 0.5 to 50 L/min, and an inert gas such as nitrogen or argon is used.

The capillary 11 is fixed to a connector 30 through a sealing unit (not shown) such as a packing, an O-ring, and a ferule. The capillary 11 and the connector 30 may be integrated with each other by bonding, welding, brazing, and the like. In a case in which a gas is carried between the capillary 11 and the gas spray pipe 28, a sealing material 31 that seals the gas may be preferably disposed. In FIG. 1, although the sealing material is an area seal, the sealing material may be another configuration such as a shaft seal as long as hermeticity can be maintained. As the sealing material 31, a ring such as an O-ring, a packing, a resin, and rubber can be used.

The connector 30 has a pipe (not shown) connecting unit 32, and a pipe can be connected to the connector 30 through the pipe connecting unit 32. The sample liquid solution is supplied to the pipe, and thus a sample is supplied to the capillary 11.

The capillary 11 is exchanged due to the clogging and the like of the capillary 11 (here, the capillary 11 is exchanged in the state in which the capillary 11 is fixed to the connector 30), and then the surfaces of the connector 30 and the gas spray pipe 28 contact with each other as shown in FIG. 1. Thus, in the case in which the difference in the length of the capillary 11 between analyzers is small, the position of the downstream end 12 in the Z-direction is supposed to be reproduced. However, the downstream side of the gas spray pipe 28 is often made narrow in order to accelerate the velocity of a gas to be sprayed. There is a possibility that unlike FIG. 1, the capillary 11 having a considerably small diameter does not reach a predetermined position at which the capillary 11 slightly projects from the downstream end 29 of the gas spray pipe 28 due to the capillary 11 being caught in the midway point, for example. When a sample is delivered in the state in which the downstream end 12 of the capillary 11 remains in the inside of the gas spray pipe 28, the inside of the gas spray pipe 28 is soaked, which might be a cause of a trouble for contamination or failure of the analyzer.

Therefore, the first embodiment is provided with an ammeter 34 that monitors a value of a current carried through the counter electrode 26 when a voltage is applied from a power supply 33 to the capillary 11 after the capillary 11 is exchanged. The controller 10 determines the position of the downstream end 12 of the capillary 11 according to the monitored current value, and determines whether analysis is executed or stopped depending on the result. In the case in which analysis is stopped, an alert is presented using an indicator 35 or any other device, for example. As the alert, various devices may be such as a monitor, a lamp, and a display, which are visual, and a buzzer and a siren, which are auditory, and the like.

Figure 2:
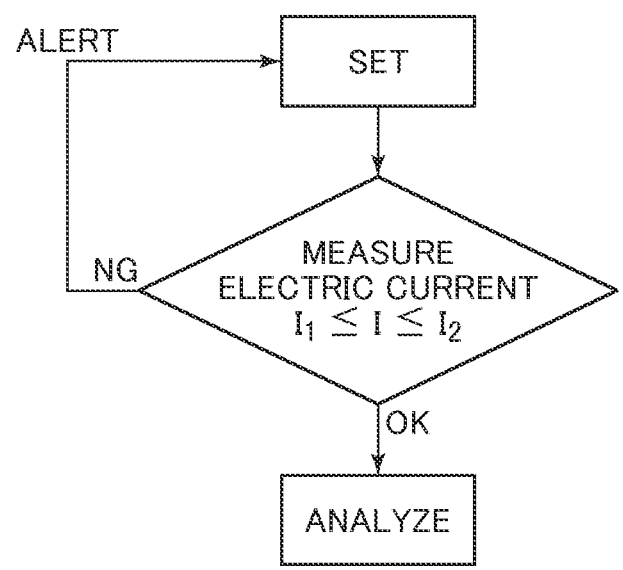
FIG. 2 is a flowchart that describes procedures of exchanging a capillary 11.

FIG. 2 is a flowchart that describes procedures of exchanging the capillary 11. After a new capillary 11 is set at the time of exchanging the capillary 11, a value of a current carried through the counter electrode 26 is monitored by the ammeter 34. The controller 10 determines whether the position of the downstream end 12 of the capillary 11 is at a normal position according to a measured result. The controller 10 outputs projection amount information expressing whether the position of the downstream end 12 of the capillary 11 is at the normal position according to the determined result. The projection amount will be described with reference to FIGS. 6 to 9 described later. When the downstream end 12 is at the normal position, analysis is executed, whereas in the case in which it is not possible to determine that the downstream end 12 is at the normal position, the controller 10 outputs an alert with the indicator 35.

When actually determining whether the downstream end 12 is at the normal position, in many cases, a current value range to some extent is accepted. For example, in the case in which a current value (I) measured at the normal position is 30 µA plus or minus 2 µA, the range of fluctuations from a minimum value $(I_1)$=28 µA to a maximum value $(I_2)$=32 µA is accepted, i.e., the condition of $I_1 \leq I \leq I_2$ can be set to the acceptable range. The acceptance condition is one example, and the range of acceptance may be set to a broader range or a narrower range using different conditional expressions. In the case in which the position of the downstream end 12 is not acceptable and an alert is outputted, the capillary 11 is again installed. In the case in which the position of the downstream end 12 is not acceptable repeatedly for many times, it may be determined that the component itself causes an error and the capillary 11 may be exchanged for a new capillary 11.

Figure 3:
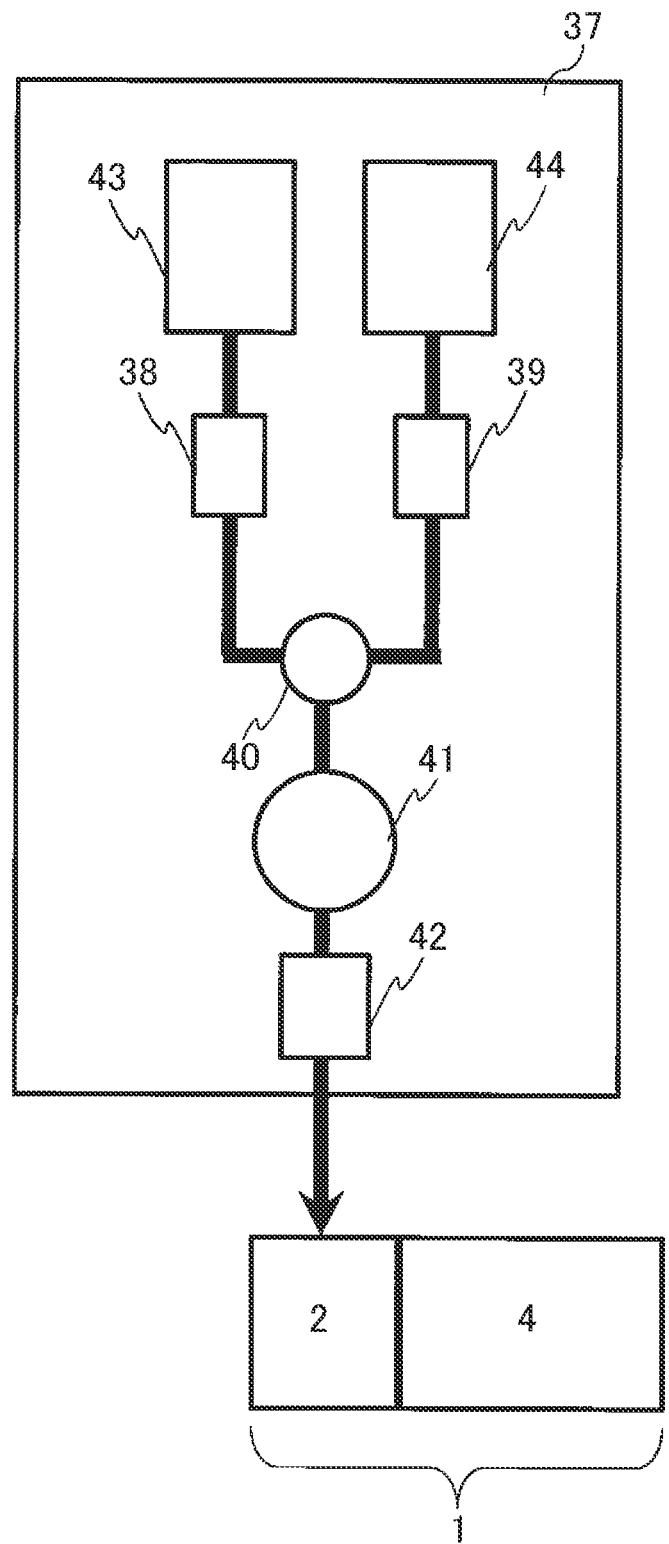
FIG. 3 is a diagram of an example in which a liquid chromatograph (LC) is combined with the mass spectrometer 1.

FIG. 3 is an example in which a liquid chromatograph (LC) is combined with the mass spectrometer 1. Generally, the mass spectrometer 1 is often used in combination with a liquid chromatograph (LC) 37 as in FIG. 3. The LC 37 is mainly formed of pumps 38 and 39, a mixer 40, a sample injection unit 41, a separation column 42, and the like. A sample injected into the sample injection unit 41 are delivered by the pumps 38 and 39, and delivered to the separation column 42 by moving phases 43 and 44 mixed by the mixer 40. The mixing ratio at the mixer 40 is adjustable according to the flow ratios of the pumps 38 and 39. For the moving phases 43 and 44, water (or a solvent whose principal component is water) is used for one, and an organic solvent such as methanol or acetonitrile (or a solvent whose principal component is an organic solvent) is used for the other. Generally, in the LC 37, a sample is injected into the separation column 42 that is washed and balanced with water, an organic solvent, or the like used in the moving phases 43 and 44, and then sample components are eluted from the separation column 42 by the moving phase 43 or 44, or by a liquid solution having both moving phases mixed. In elution, the mixing ratio of the moving phases 43 and 44 is temporally changed, and the LC peaks of the sample components can be hourly acquired (LC separation). The ion source 2 is disposed on the downstream of the LC 37 as in FIG. 3, the sample corresponding to the LC peak is hourly ionized, and the ions of the sample are analyzed by the mass spectrometer 1. The timing (holding time) of the LC peak corresponding to the sample component can be uniquely defined from the type of the separation column 42, the mixing ratios of the moving phases 43 and 44, the length of the pipes, and the like.

Figure 4:
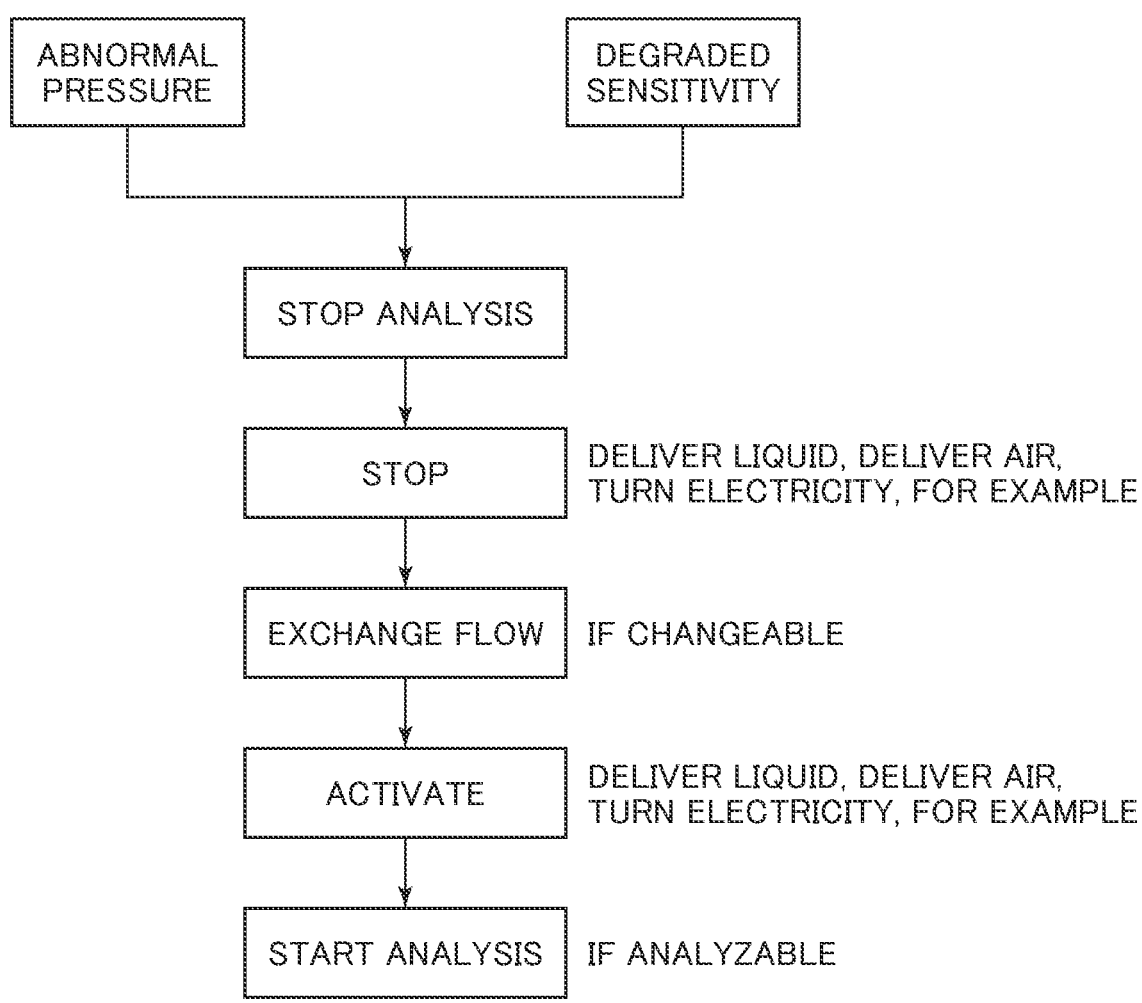
FIG. 4 is a chart that describes the timing of exchanging a capillary.

FIG. 4 is a chart that describes the timing of exchanging the capillary. In the system in FIG. 3, in the process of delivery to the capillary 11 by the pumps 38 and 39, pressure abnormality due to the clogging of the capillary 11, a reduction on sensitivity due to the degradation of the downstream end 12 of the capillary 11, and the like possibly occur. In the case in which such a phenomenon occurs, generally, the capillary 11 is exchanged for a new one. In the case in which pressure abnormality or a reduction in sensitivity occurs, analysis is temporarily stopped, and liquid delivery, air supply, current carrying, and the like are stopped (at this time, generally, the vacuum pumps 20, 21, and 22 are not stopped). After that, when the pressures of the pumps 38 and 39 and the temperature of the ion source 2 sufficiently drop to achieve a state in which the capillary 11 can be exchanged, the exchanging flow in FIG. 2 is carried out. After the exchanging flow is finished, liquid delivery, air supply, current carrying, and the like are started. When the pressures of the pumps 38 and 39 and the temperature of the ion source 2 are sufficiently stabilized to achieve a state in which analysis can be performed, analysis is started.

Figure 5:
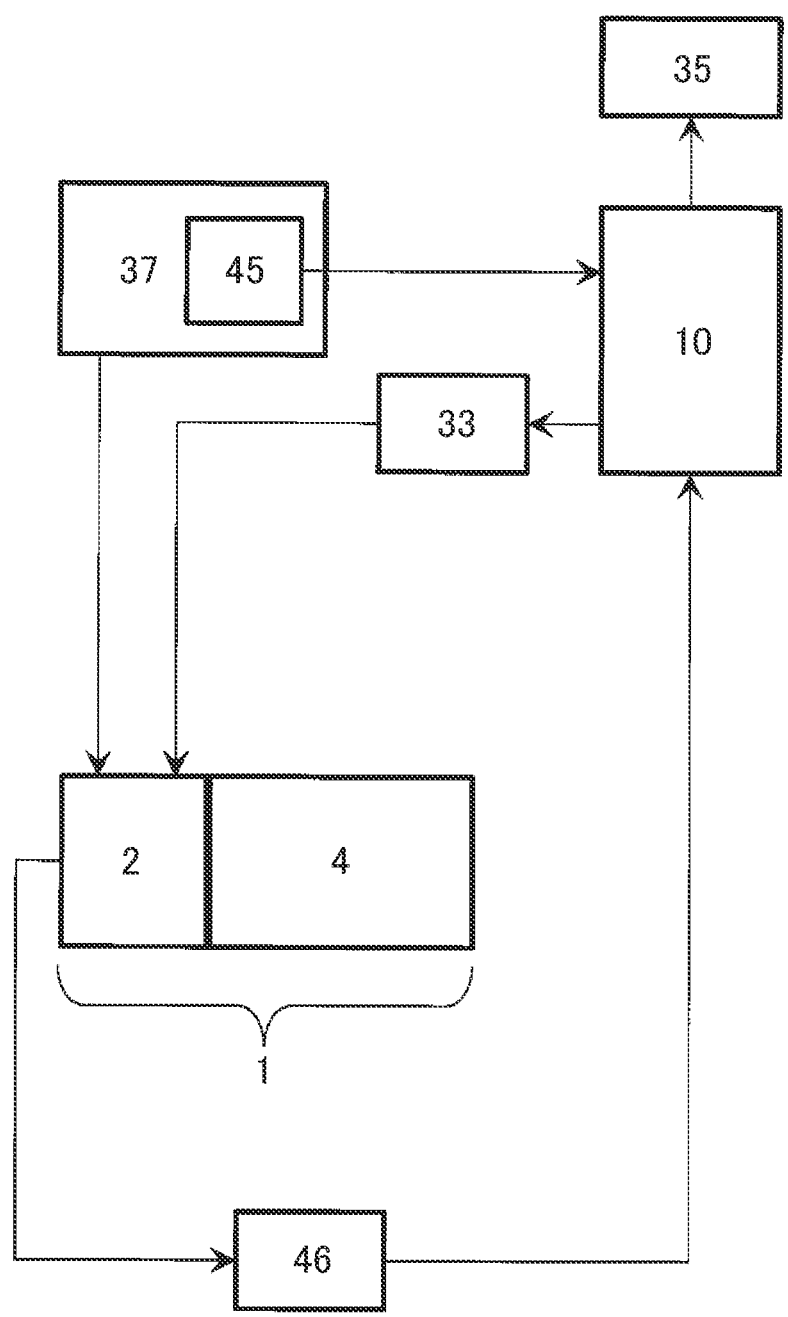
FIG. 5 is a diagram of examples of functions that determines an exchangeable state or an analyzable state.

FIG. 5 is examples of functions that determines an exchangeable state or an analyzable state. For example, a pressure gage 45 that monitors the pressure of the LC 37 and a temperature adjusting unit 46 that monitors the temperature of the ion source 2 may be provided. In addition to these, various interlock functions may be disposed on the power supplies, analyzer covers (not shown), and the like.

Figure 6:
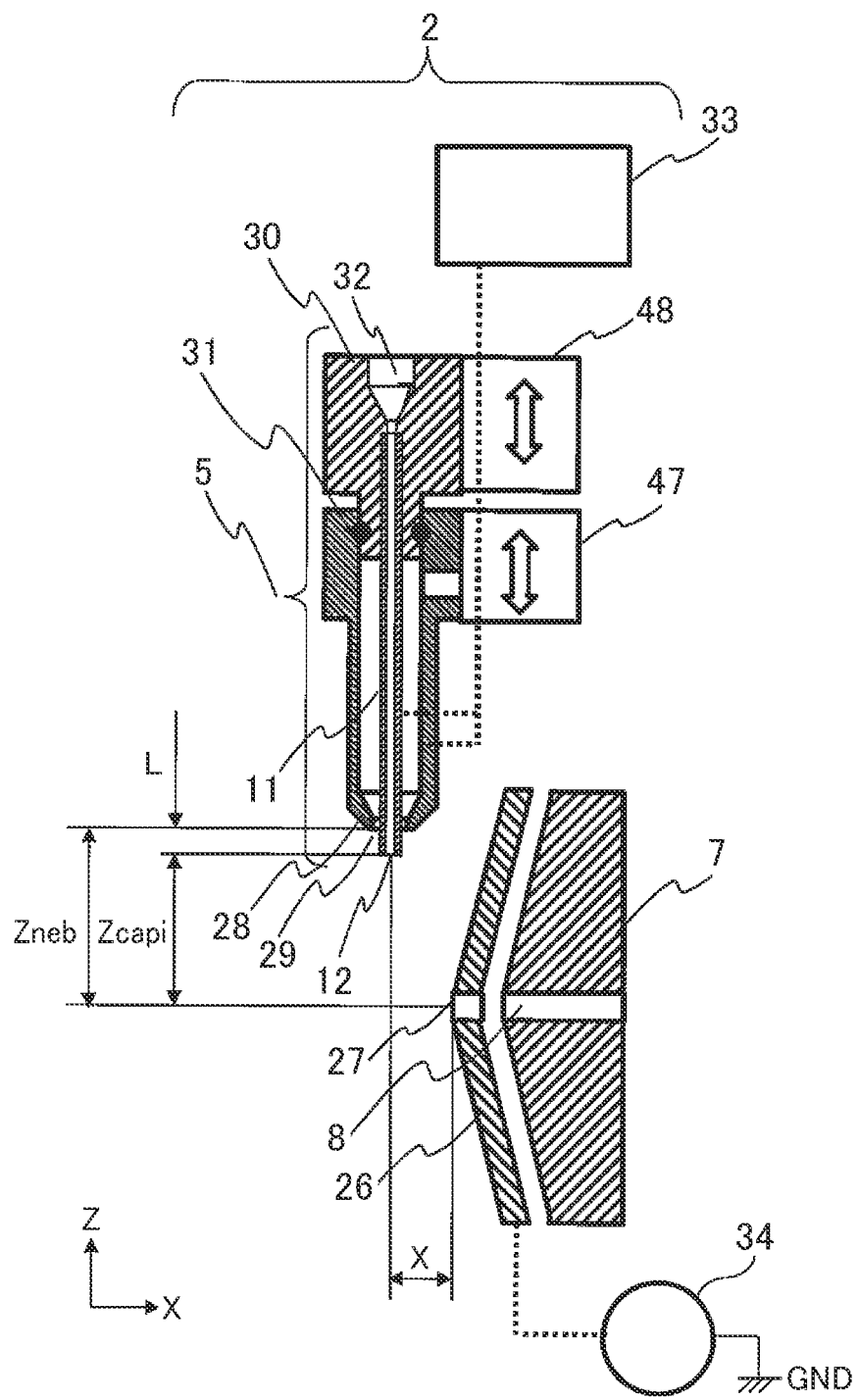
FIG. 6 is a diagram showing an exemplary configuration for a preparatory experiment used for confirming differences in current values due to the position of the downstream end 12 of the capillary 11.

FIG. 6 is an exemplary configuration for a preparatory experiment used for confirming differences in current values due to the position of the downstream end 12 of the capillary 11. For convenience, differences from FIG. 1 alone will be described. The present configuration has a drive unit 47 that changes a relative position ($Z_{neb}$) in the Z-direction of the downstream end 29 of the gas spray pipe 28 to the center of the hole 27 of the counter electrode 26 and a drive unit 48 that changes a relative position ($Z_{capi}$) of the downstream end 12 of the capillary 11 in the Z-direction. Since the relative positions of the capillary 11 and the gas spray pipe 28 in the Z-direction are changed, the sealing material 31 is formed under shaft seal scheme in the present configuration. The counter electrode 26 was used whose diameter of the hole 27 of the counter electrode 26 was 4 mm.

In FIG. 6, the downstream end 12 of the capillary 11 projects to the space in the ion source chamber 6. The projection amount of the capillary 11 can be defined as the length of a part of the capillary 11, which is not covered with the gas spray pipe 28 (the part of a length L), exposed to the space in the ion source chamber 6, or can be defined as the length of the capillary 11 itself projecting from the inner wall of the ion source chamber 6. In any case of using those definitions, it is determined whether the projection amount is proper, and thus it can be determined whether the position of the downstream end 12 of the capillary 11 is proper. The result that verifies this will be described with reference to FIGS. 7 to 9.

Figure 7:
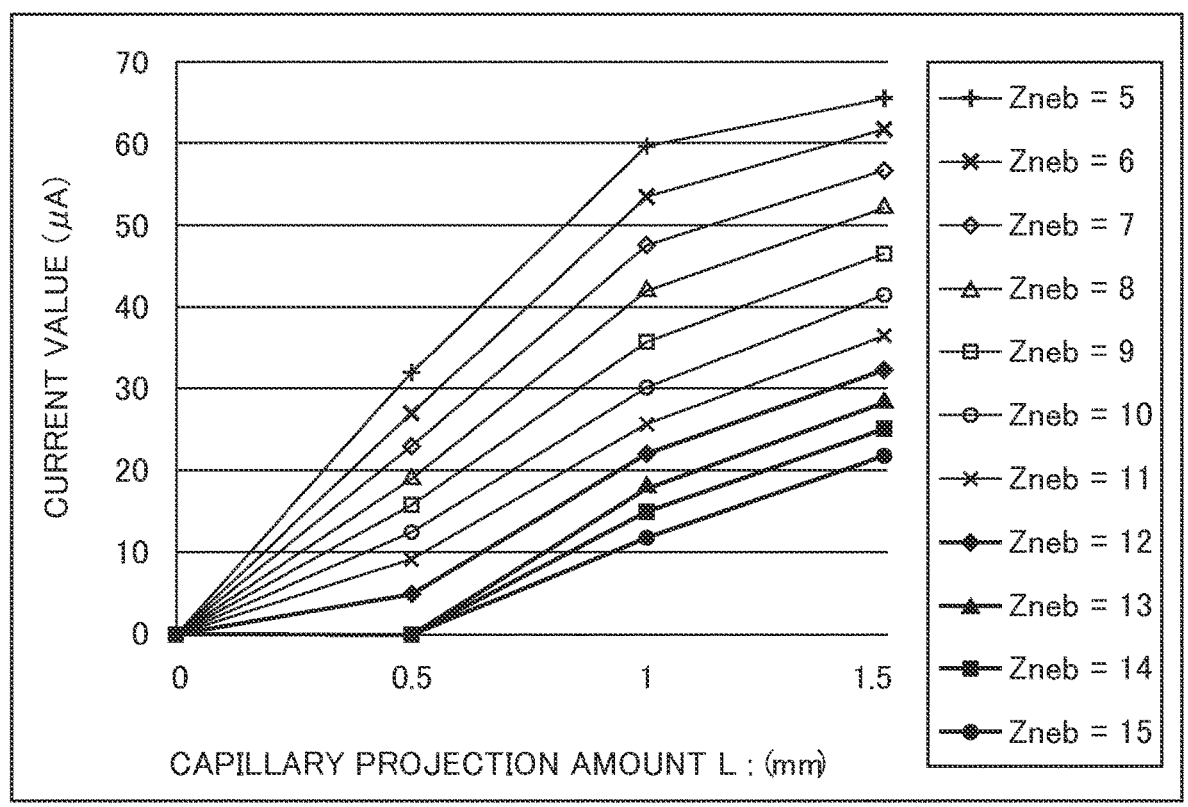
FIG. 7 is a graph showing a result in which the current value of an electric current carried through a counter electrode is monitored by an ammeter when Zneb is fixed and the projection amount (L) of the capillary 11 is changed.

FIG. 7 shows results in which the value of the current carried through the counter electrode 26 is monitored by the ammeter 34 when $Z_{neb}$ is fixed and the projection amount (L) of the capillary 11 is changed. Here, a distance (X) between the counter electrode 26 and the center of the capillary 11 was set to 5 mm, and a voltage of 5 kV is applied from the power supply 33 to the capillary 11 and to the gas spray pipe 28. In FIG. 7, current values were plotted in which $Z_{neb}$ was fixed at one millimeter intervals ranging from five to fifteen millimeters and the projection amount (L) of the capillary 11 was changed. Fixing $Z_{neb}$ is based on assuming a configuration in which the position of the gas spray pipe 28 is regulated by the housing part such as the ion source chamber 6 as in FIG. 1. By fixing $Z_{neb}$ and changing L, (1) the length of a part of the capillary 11, which is not covered with the gas spray pipe 28 (the part of the length L), exposed to the space in the ion source chamber 6 is changed, and (2) the length of the capillary 11 itself projecting from the inner wall of the ion source chamber 6 is changed. In other words, the projection amount of the capillary 11 projecting to the space in the ion source chamber 6 is changed.

Under any condition for $Z_{neb}$, the difference in the current value due to L is noticeable. This suggests that it can be determined whether the position of the downstream end 12 of the capillary 11 is at the normal position according to the current value. Therefore, with the use of the length L of a part of the capillary 11, which is not covered with the gas spray pipe 28 (the part of the length L), exposed to the space in the ion source chamber 6, or with the use of the length of the capillary 11 itself projecting from the inner wall of the ion source chamber 6, it can be determined whether the position of the downstream end 12 is at the normal position.

Figure 8:
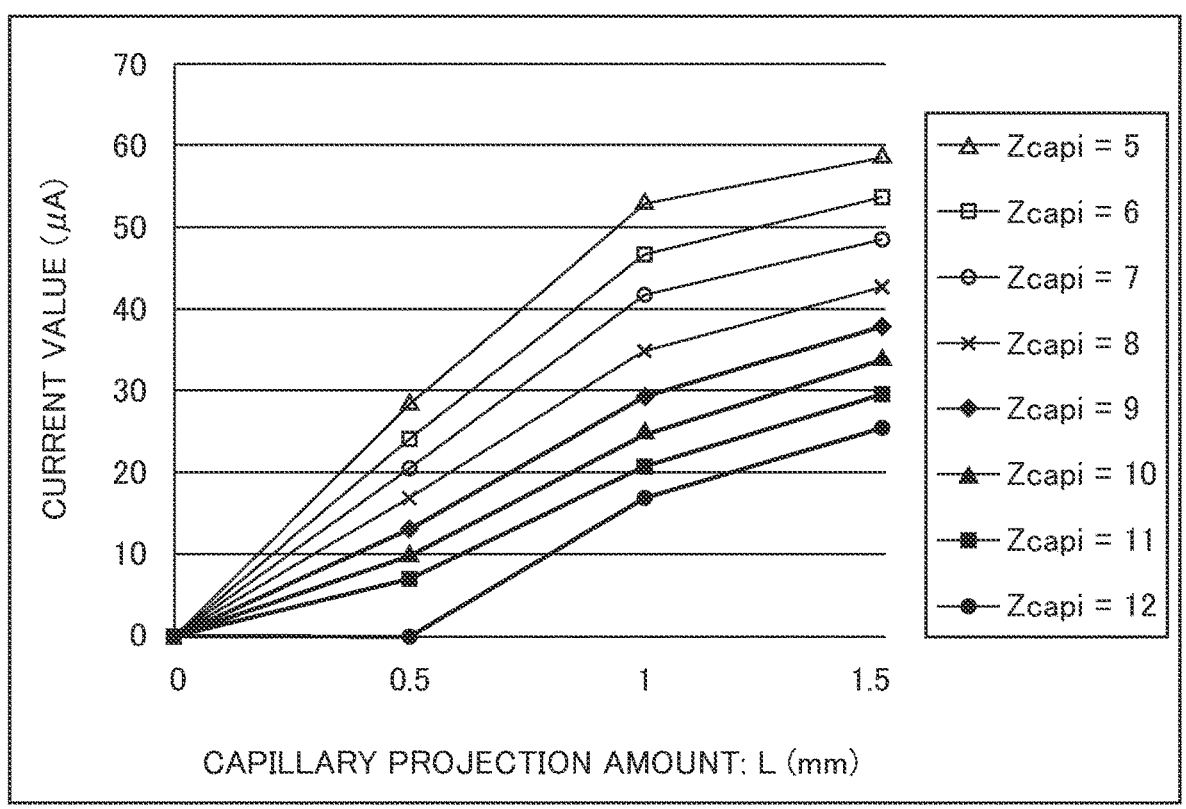
FIG. 8 is a graph plotting current values when Zcapi is fixed at one millimeter intervals ranging from five to twelve millimeters and the projection amount (L) of the capillary 11 is changed.

In FIG. 8, current values were plotted in which $Z_{capi}$ is fixed at one millimeter intervals ranging from five to twelve millimeters and the projection amount (L) of the capillary 11 is changed. Unlike FIG. 1, fixing $Z_{capi}$ is based on assuming a configuration in which the position of the capillary 11 is regulated by the housing part such as the ion source chamber 6. By fixing $Z_{capi}$ and changing L, the length of a part of the capillary 11, which is not covered with the gas spray pipe 28 (the part of the length L), exposed to the space in the ion source chamber 6 is changed. In other words, the projection amount of the capillary 11 projecting to the space in the ion source chamber 6 is changed.

Under any condition for $Z_{capi}$, the difference in the current value due to L is noticeable. This suggests that it can be determined whether the position of the downstream end 12 of the capillary 11 is at the normal position according to the current value. Therefore, with the use of the length L of a part of the capillary 11, which is not covered with the gas spray pipe 28 (the part of the length L), exposed to the space in the ion source chamber 6, it can be determined whether the position of the downstream end 12 is at the normal position.

Figure 9:
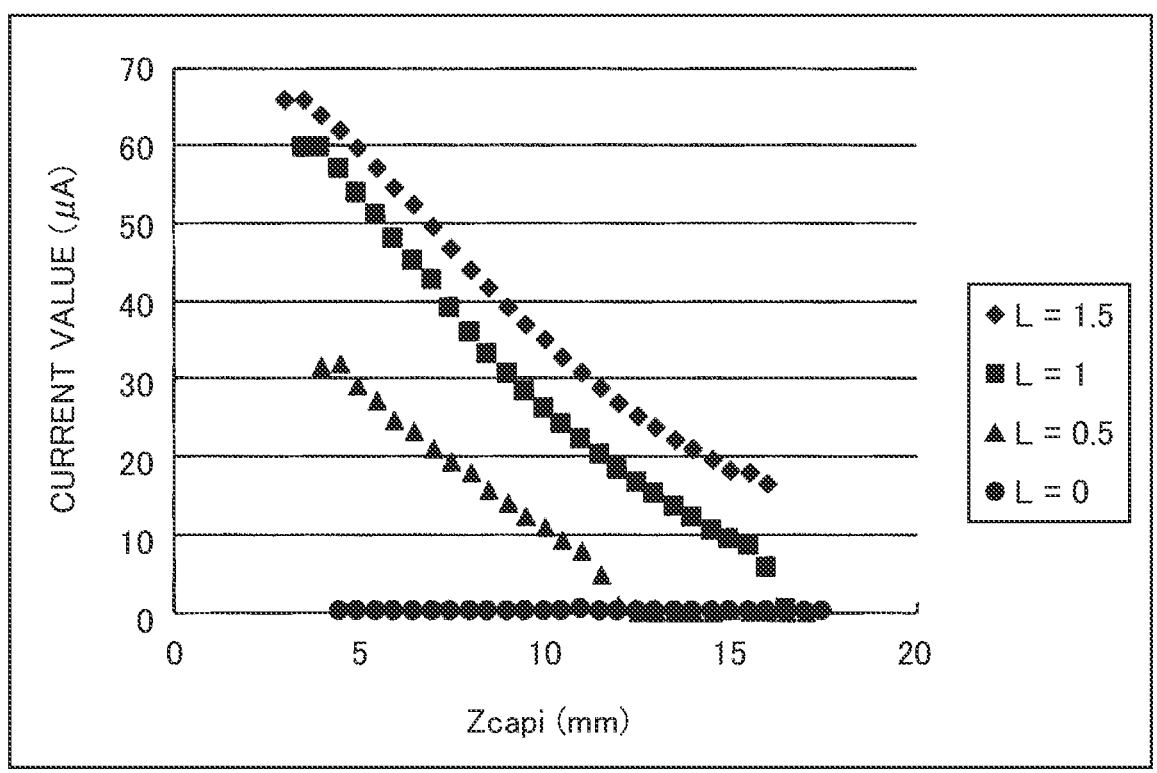
FIG. 9 is a graph showing a result in which current values are plotted for every condition under which L is constant and Zcapi is changed.

FIG. 9 shows results in which current values are plotted for every condition under which L is constant and $Z_{capi}$ is changed. By fixing L and changing $Z_{capi}$, the length of the capillary 11 itself projecting from the inner wall of the ion source chamber 6 is changed. In other words, the projection amount of the capillary 11 projecting to the space in the ion source chamber 6 is changed. According to the results shown in FIG. 9, with the use of the length of the capillary 11 itself projecting from the inner wall of the ion source chamber 6, it can be determined whether the position of the downstream end 12 is at the normal position.

According to the verified results in FIGS. 7 to 9, it is shown that regardless that the relative position (X) between the downstream end 12 of the capillary 11 and the counter electrode 26 is constant, the projection amount of the capillary 11 projecting to the space in the ion source chamber 6 greatly depends on the current value. Accordingly, it is possible to determine whether the position of the capillary 11 is proper using the current value.

First Embodiment: Conclusion

In the ion source 2 according to the first embodiment, when no sample is supplied to the capillary 11, the electric current carried by applying a voltage to the capillary 11 by the power supply 33 is measured by the ammeter 34, and the controller 10 determines whether the capillary 11 is at the normal position according to measured results. Therefore, before the point in time at which the mass spectrometer 1 starts analysis of ions, it can be confirmed whether the capillary is at the normal position, and thus it is possible to prevent a trouble due to contamination, device failure, and the like, and it is possible to ensure high analysis stability.

Second Embodiment

Figure 10:
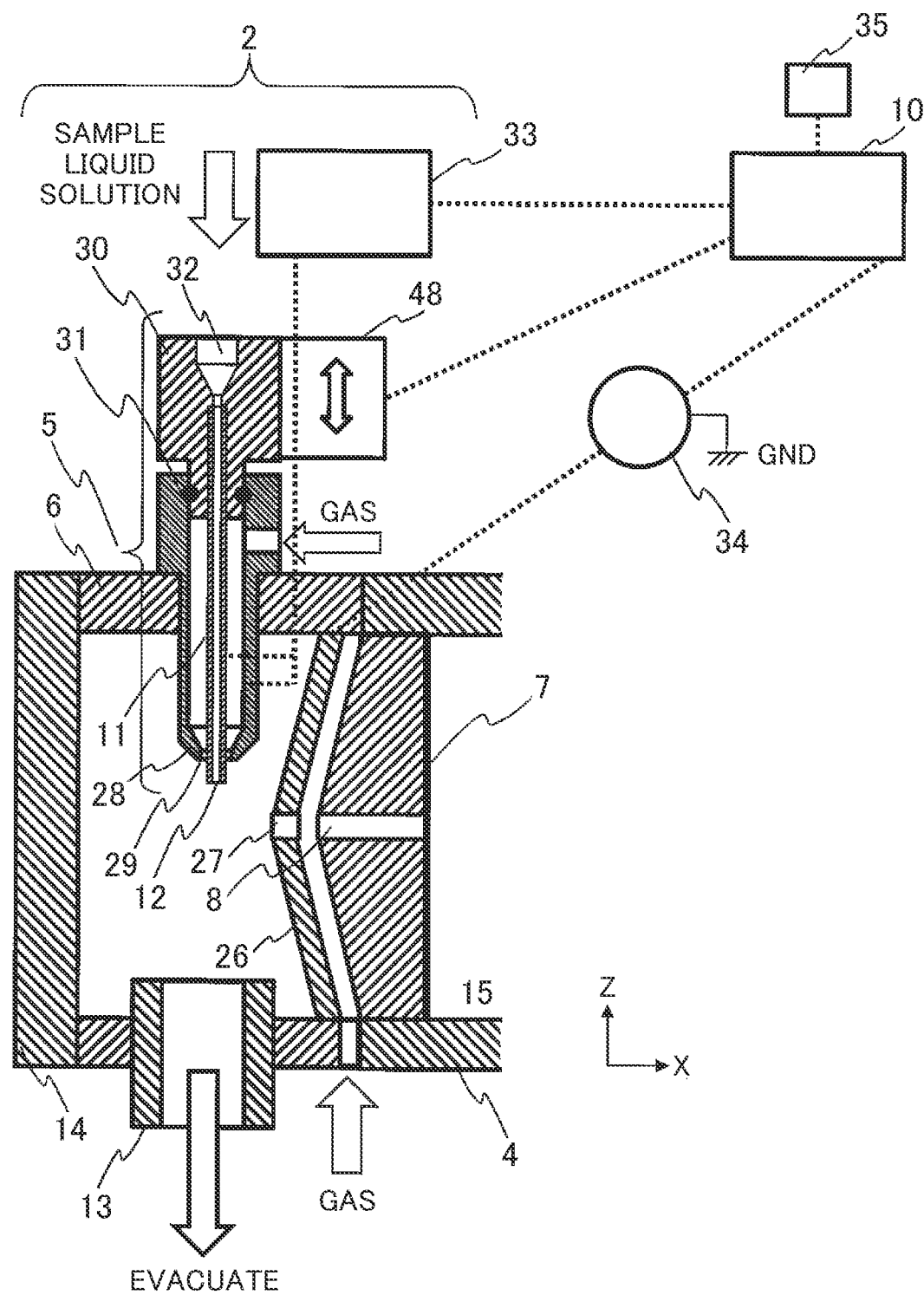
FIG. 10 is a configuration diagram of an ion source 2 according to a second embodiment.

FIG. 10 is a configuration diagram of an ion source 2 according to a second embodiment of the present invention. In the second embodiment, a configuration will be described in which the position of a capillary 11 is adjusted from the measured result of an electric current. For convenience of the description, differences from the first embodiment will be mainly described.

An ion source 2 of FIG. 10 includes a drive unit 48 that adjusts the position of the capillary 11 in the Z-direction with respect to a gas spray pipe 28. Since relative positions in the Z-direction between the capillary 11 and the gas spray pipe 28 are changed, a sealing material 31 is formed under shaft seal scheme in the present configuration.

Figure 11:
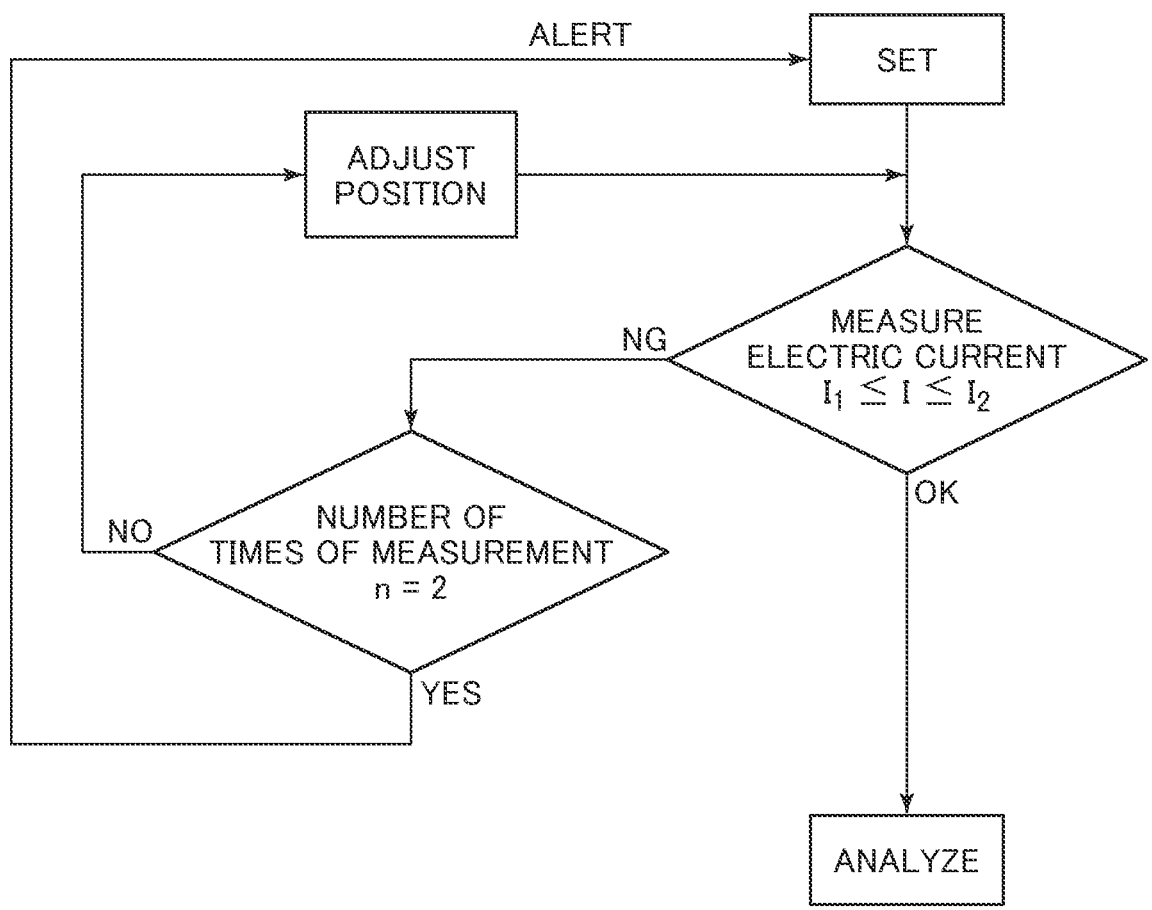
FIG. 11 is a flowchart that describes procedures of exchanging a capillary 11 in the second embodiment.

FIG. 11 is a flowchart that describes procedures of exchanging the capillary 11 in the second embodiment. After a new capillary 11 is set at the time of exchanging the capillary 11, a value of a current carried through a counter electrode 26 is monitored by an ammeter 34. A controller 10 determines whether the position of a downstream end 12 of the capillary 11 is at the normal position according to measured results. When the downstream end 12 is at the normal position, analysis is executed. In the case in which it is not possible to determine that the downstream end 12 is at the normal position, if the number of times (n) of measuring the electric current is the first time, the drive unit 48 adjusts the position of the downstream end 12 of the capillary 11 in the Z-direction. In adjusting the position, the present position may be determined from the current value of the measured result based on the results obtained beforehand in FIG. 7, for example, and the difference between the position and the normal position may be corrected. This adjustment may be automatic or manual. After the position is adjusted, the electric current is again measured. When the measured result is in the range of $I_1 \leq I \leq I_2$ similarly to FIG. 2, the result is accepted, and analysis is started. In the case in which the measured result is not accepted even after measurement is again performed, the number of times n=2, and then it is determined that an error is due to the component itself. An action can be taken, such as outputting an alert similarly to FIG. 2, or exchanging the capillary 11 to a new capillary 11, for example. The threshold of the number of times of measurement, n, can be set to a value other than n=2.

In accordance with the ion source 2 according to the second embodiment, even though the position at which the capillary 11 is installed is not optimum, it is possible to adjust the position without removing the capillary 11. Accordingly, it is possible to minimize the loss of throughput due to exchanging the capillary 11.

Third Embodiment

Figure 12:
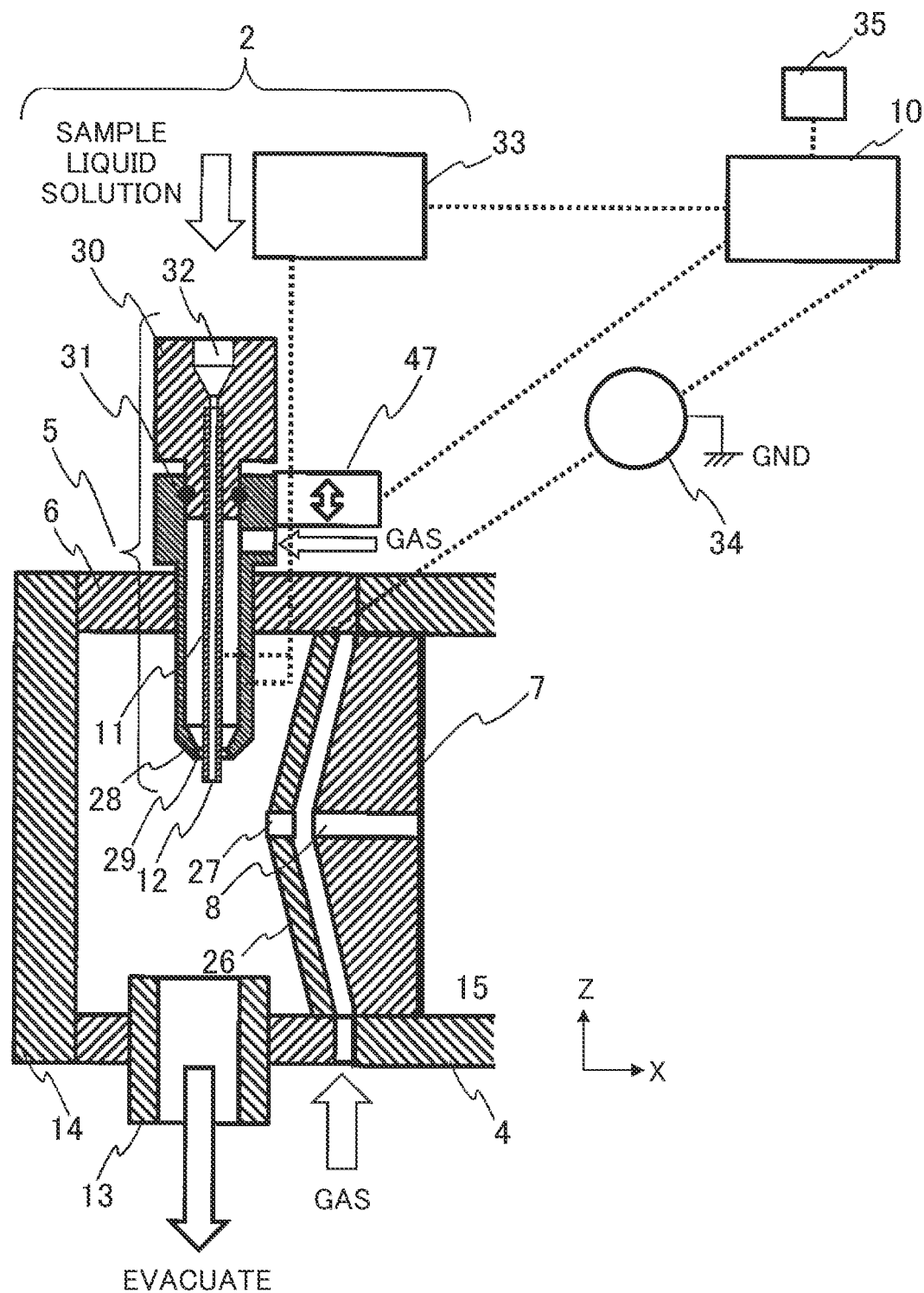
FIG. 12 is a configuration diagram of an ion source 2 according to a third embodiment.

FIG. 12 is a configuration diagram of an ion source 2 according to a third embodiment of the present invention. In the third embodiment, a configuration will be described in which the position of a gas spray pipe 28 is adjusted from the measured result of an electric current. For convenience of the description, differences from the first embodiment will be mainly described.

The ion source 2 of FIG. 12 includes a drive unit 47 that adjusts the position of a gas spray pipe 28 in the Z-direction with respect to a capillary 11. Since relative positions in the Z-direction between the capillary 11 and the gas spray pipe 28 are changed, the sealing material 31 is formed under shaft seal scheme in the present configuration. Since the position of the capillary 11 is a reference position, the structure is provided such that the position of the capillary 11 or of a connector 30 is regulated with respect to a housing part such as an ion source chamber 6 through some member (not shown) and the like. The procedures of exchanging the capillary 11 is almost similar to FIG. 11, and the description thereof is omitted.

Similarly to the second embodiment, in the ion source 2 according to the third embodiment, even though the position at which the capillary 11 is installed is not optimum, it is possible to adjust the position without removing the capillary 11. Accordingly, it is possible to minimize the loss of throughput due to exchanging the capillary 11. The drive unit 47 described in the second embodiment and the drive unit 48 described in the third embodiment can be combined for use as in FIG. 6.

Fourth Embodiment

Figure 13:
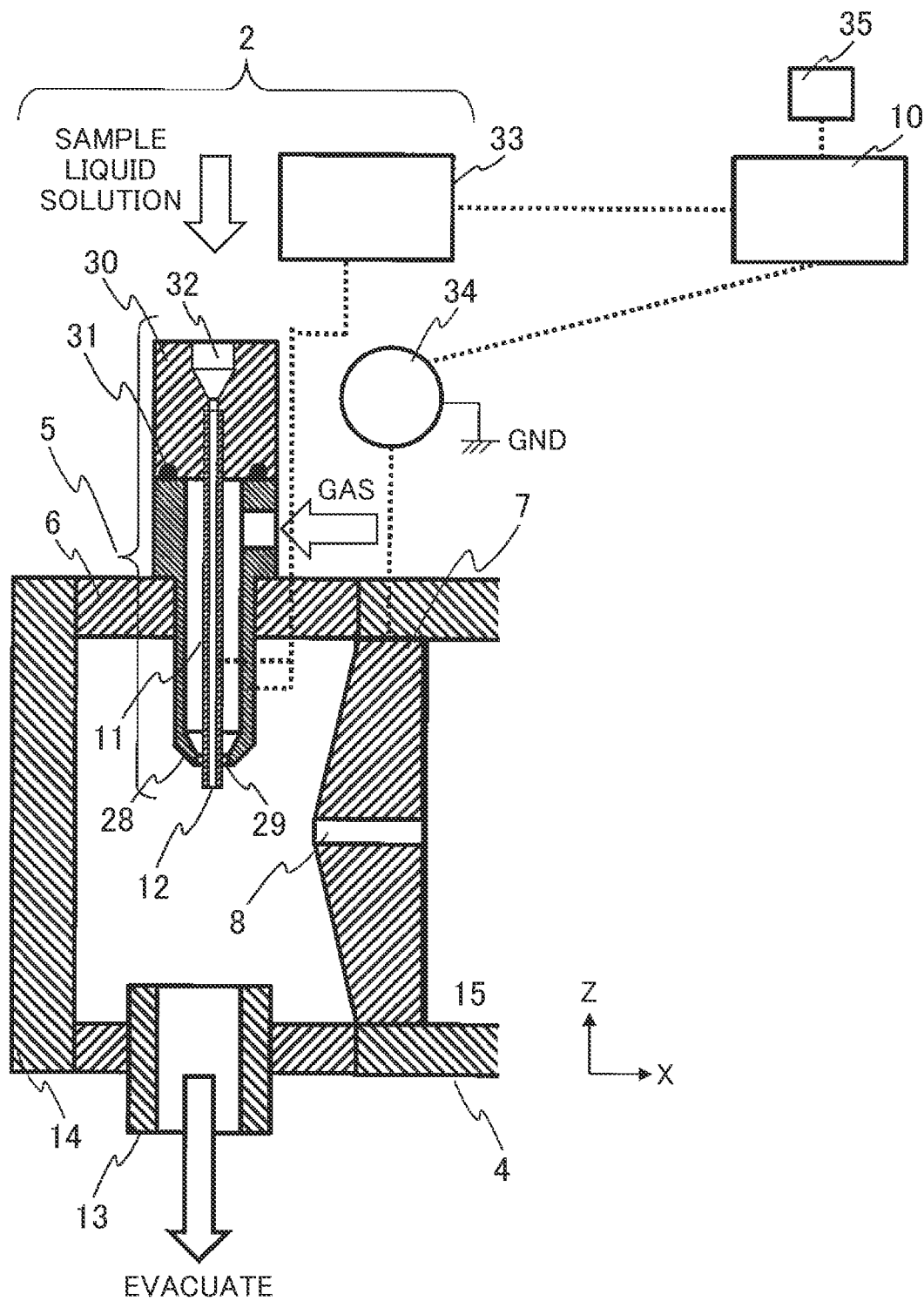
FIG. 13 is a configuration diagram of an ion source 2 according to a fourth embodiment.

FIG. 13 is a configuration diagram of an ion source 2 according to a fourth embodiment of the present invention. In the fourth embodiment, an ion source with a configuration in which the position of the downstream end of the capillary 11 is determined from the current value of a leading-in electrode 7 will be described. For convenience of the description, differences from the first embodiment will be mainly described.

Unlike the first to the third embodiments, in FIG. 13, the counter electrode 26 is not present. Under the conditions in which the flow rate of a sample liquid solution is small, in some cases, spraying a gas from a counter electrode 26 or from the inner side of the counter electrode 26 is unnecessary. The present configuration is applicable in such a case. Since no counter electrode 26 is provided in the present configuration, an ammeter 34 measures the value of a current carried through the leading-in electrode 7. The other configurations and procedures are similar to the first to the third embodiments, and the similar effect can be obtained.

Fifth Embodiment

Figure 14:
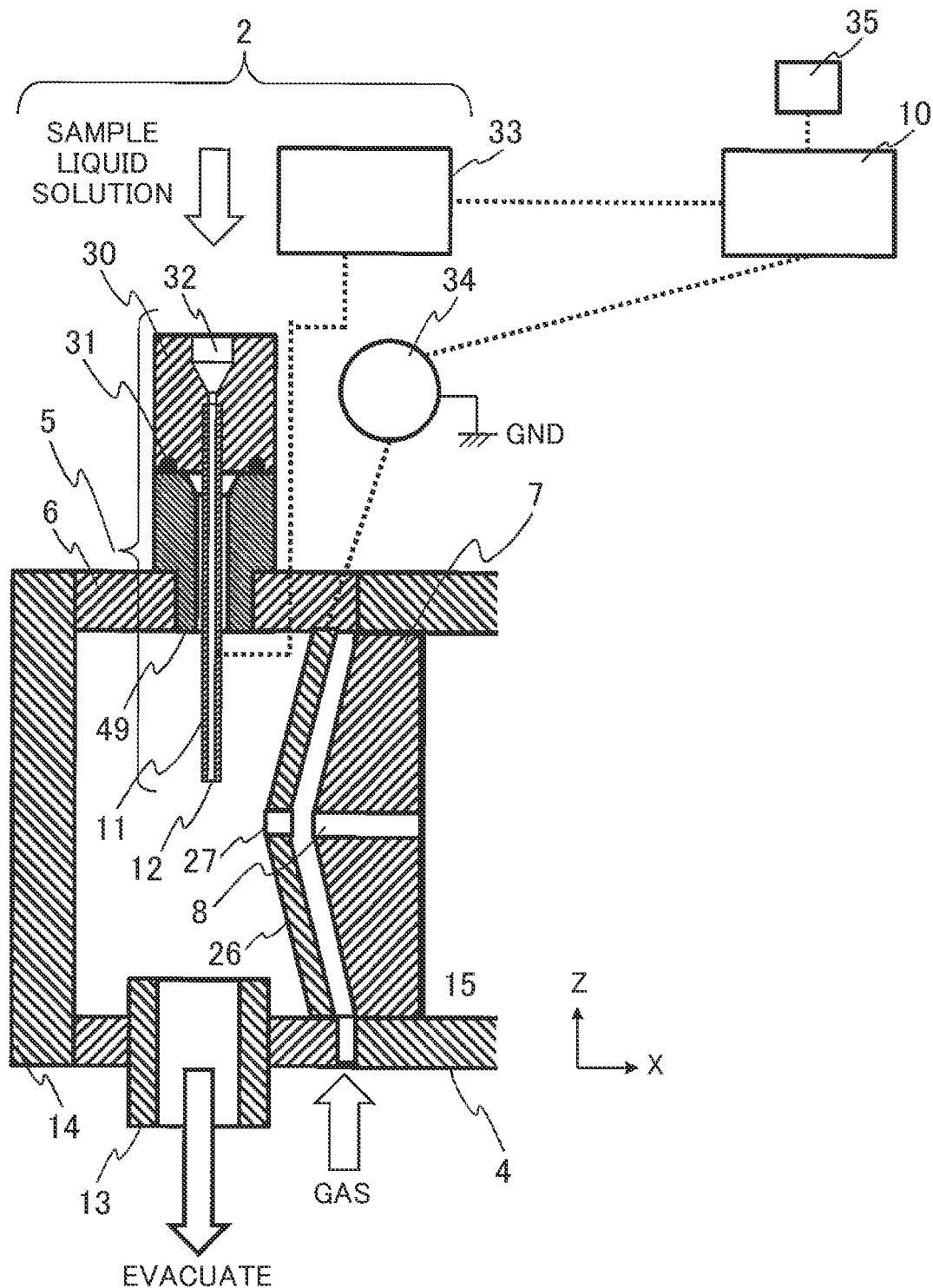
FIG. 14 is a configuration diagram of an ion source 2 according to a fifth embodiment.

FIG. 14 is a configuration diagram of an ion source 2 according to a fifth embodiment of the present invention.

The ion source 2 according to the fifth embodiment includes no gas spray pipe 28. For convenience of the description, differences from the first embodiment will be mainly described.

Under the conditions in which the flow rate of a sample liquid solution is small, in some cases, spraying a gas from a gas spray pipe 28 or from the inner side of the gas spray pipe 28 is unnecessary. Since no gas spray pipe 28 is provided, a capillary 11 or a connector 30 is installed on an adapter member 49 and the like in the fifth embodiment. The other configurations and procedures are similar to the first to the fourth embodiments, and the similar effect can be obtained.

Sixth Embodiment

Figure 15:
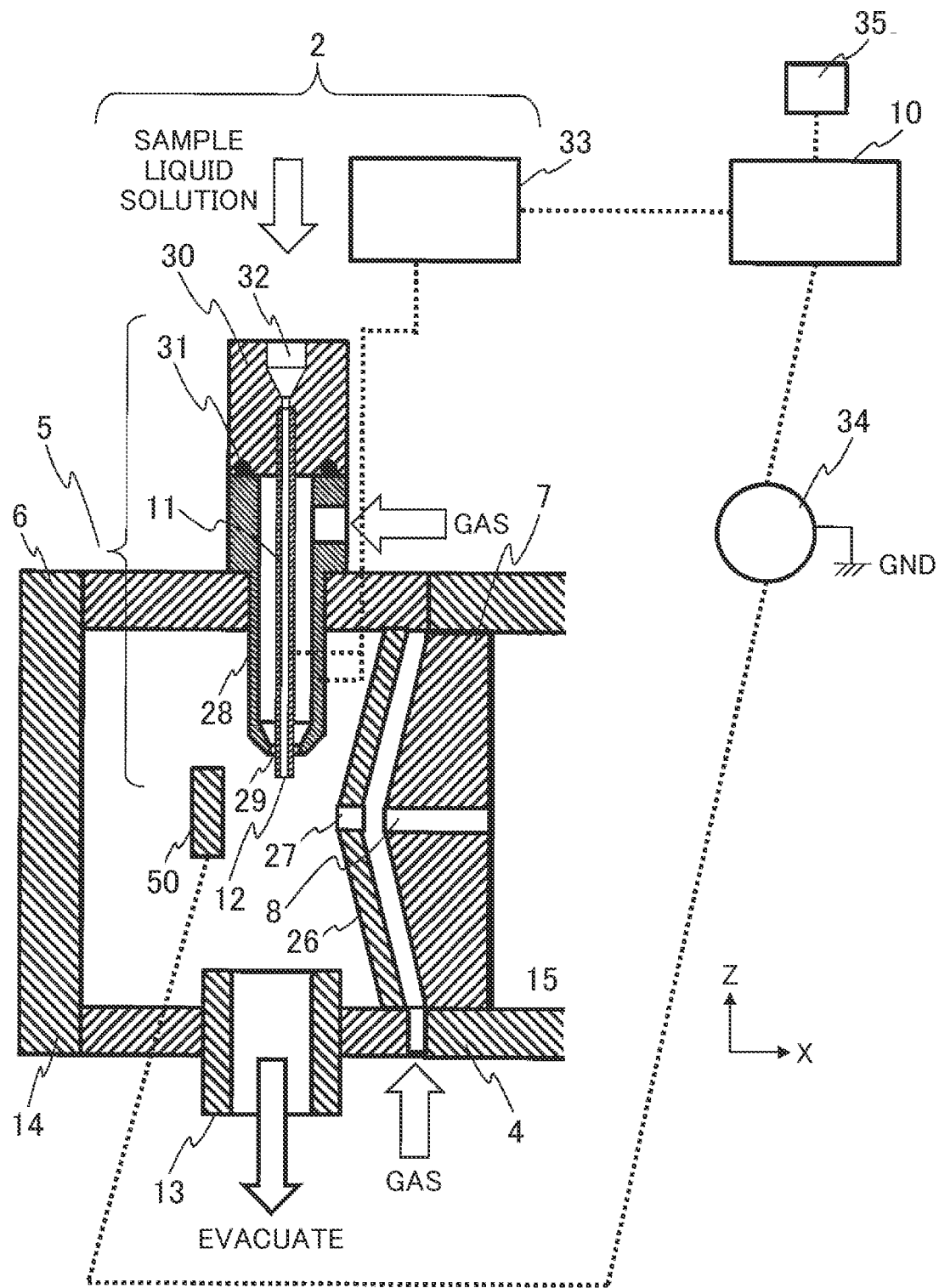
FIG. 15 is a configuration diagram of an ion source 2 according to a sixth embodiment.

FIG. 15 is a configuration diagram of an ion source 2 according to a sixth embodiment of the present invention. In the sixth embodiment, a configuration will be described in which the position of the downstream end of a capillary 11 is determined from the current value of a deflection electrode. For convenience of the description, differences from the first embodiment will be mainly described.

In addition to the configuration described in the first embodiment, the configuration of FIG. 15 includes a deflection electrode 50. When noise components such as droplets flow from a leading-in electrode 7, these lead to contamination of various electrodes in the inside of vacuum chamber 4, causing a reduction in sensitivity. Furthermore, these also lead to shortening the lifetime of a detector 25. It is possible to prevent the inflow of noise to some extent by spraying a gas in the reverse orientation from the inside of a counter electrode 26. However, in the case in which this prevention is not enough, for example, an action has to be necessary such as putting away the downstream end 12 of the capillary 11, which is a spray port of ions or droplets. Although the inflow of noise is reduced by putting away the downstream end 12, the inflow of ions is also reduced, leading to a reduction in sensitivity. In order to compensate this reduction in sensitivity, in some cases, a deflection electrode 50 is disposed in an ion source chamber 6. By applying a voltage a few positive or negative kV at the maximum to the deflection electrode 50, ions are forcedly deflected to the direction of the leading-in electrode 7, and the efficiency of introducing ions is improved.

In the case in which after the capillary 11 is located away from the leading-in electrode 7 and then the current value of the counter electrode 26 or of the leading-in electrode 7 is measured, it is likely that the electric current is detected unsuccessfully because the distance between the capillary 11 and the leading-in electrode 7 is large. In this case, by monitoring the value of a current carried through a deflection electrode 50 that can be disposed much closer, the effect similar to measuring the current value of the counter electrode 26 or the leading-in electrode 7 can be obtained. The other configurations and procedures are similar to the first to the fifth embodiments.

Seventh Embodiment

Figure 16:
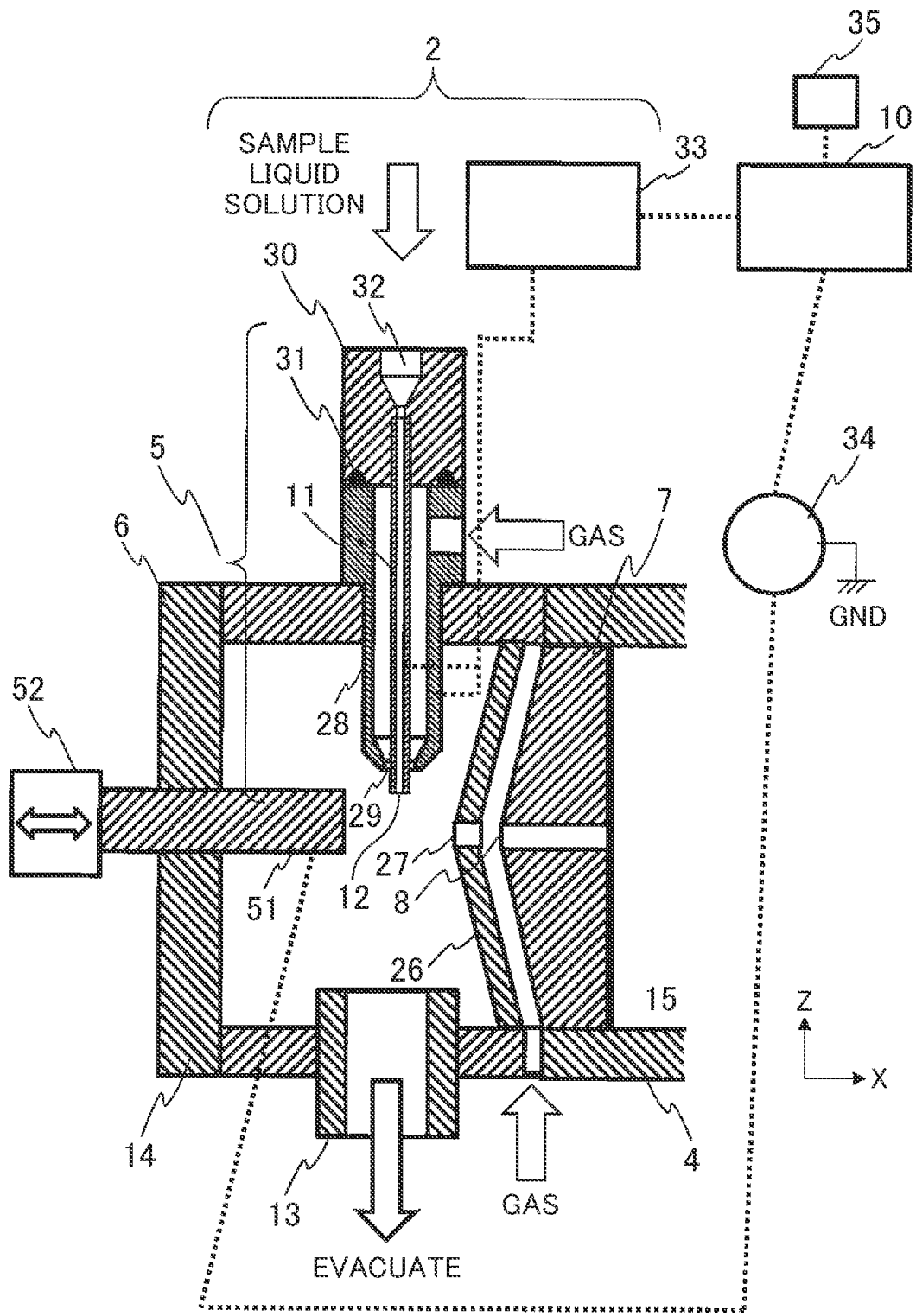
FIG. 16 is a configuration diagram of an ion source 2 according to a seventh embodiment

FIG. 16 is a configuration diagram of an ion source 2 according to a seventh embodiment of the present invention. In the seventh embodiment, a configuration will be described in which the position of the downstream end of a capillary 11 is determined from the current value of an electric current measurement dedicated electrode. For convenience of the description, differences from the first embodiment will be mainly described.

In addition to the configuration described in the first embodiment, the configuration of FIG. 16 includes an electric current measurement dedicated electrode 51. Since contamination substances such as droplets together with ions are also sprayed from a downstream end 12 of the capillary 11, it is likely that the surfaces of a counter electrode 26, a leading-in electrode 7, a deflection electrode 50, and the like are contaminated. Since a mass spectrometer 1 draws ions from a hole 8 of the leading-in electrode 7 by vacuum, ions are introduced by the force of an air current and the rate of a reduction in sensitivity is small, even though these electrodes are contaminated more or less. However, in the case in which the electric currents of these electrodes are measured, there is concern that the electric field is changed due to contamination. Therefore, in the seventh embodiment, the electric current measurement dedicated electrode 51 exclusively used for monitoring the electric current is disposed. If the electric current measurement dedicated electrode 51 is not located at a position closer to the downstream end 12 of the capillary 11 than the other electrodes, a discharge current is carried through the other electrodes. On the other hand, if the electric current measurement dedicated electrode 51 is located too close to the downstream end 12, this disturbs the electric field, causing a reduction in ionization efficiency. As a result, desirably, a drive unit 52 is disposed as in FIG. 16, which allows the electric current measurement dedicated electrode 51 to move at a place where the electric current measurement dedicated electrode 51 is not an obstacle against the electric field at the time of analysis and is not exposed to contamination.

In accordance with the ion source 2 according to the seventh embodiment, since the reliability of the result measured by an ammeter due to contamination can be enhanced, the determination accuracy whether the downstream end 12 is at the normal position is also improved. Furthermore, it is also possible to mitigate the influence on the analysis of the electric current measurement dedicated electrode 51.

Eighth Embodiment

Figure 17:
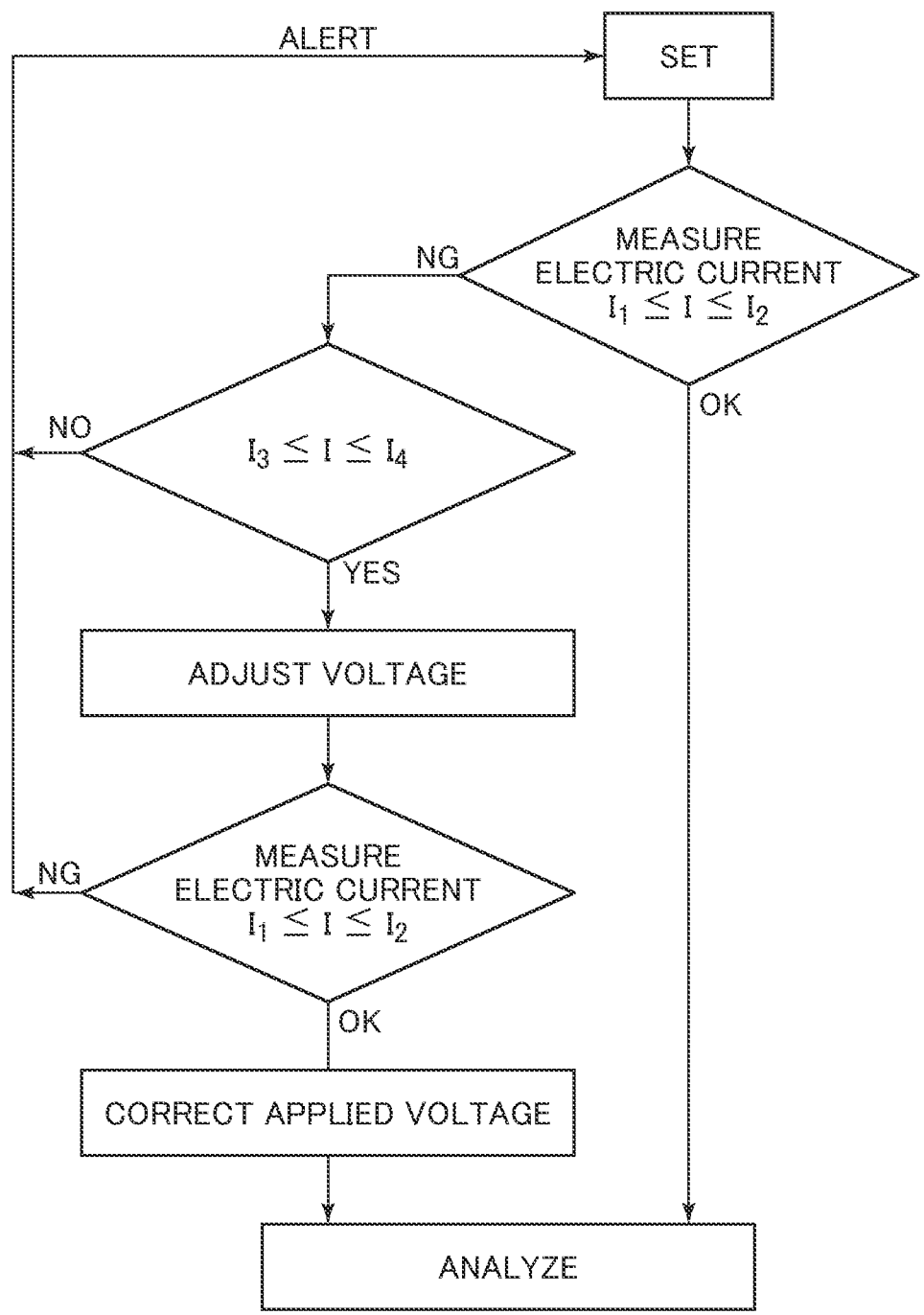
FIG. 17 is a flowchart that describes capillary exchanging procedures according to an eighth embodiment.

FIG. 17 is a flowchart that describes capillary exchanging procedures according to an eighth embodiment. In the eighth embodiment, an example operation will be described in which the voltage of a capillary is adjusted based on the measured result of an electric current to carry out a process of analysis. The configurations of an ion source 2 and a mass spectrometer 1 are similar to the first to the seventh embodiments. In the following, for convenience of explanation, the configuration of the ion source 2 according to the first embodiment is assumed, and the present flowchart can be used for the ion sources 2 according to the other embodiments.

After a new capillary 11 is set at the time of exchanging a capillary 11, a value of a current carried through a counter electrode 26 is monitored by an ammeter 34. Similarly to FIG. 2 when the measured result is in the range of $I_1 \leq I \leq I_2$, the result is accepted, and analysis is started. Even in the case in which the result is not accepted, as long as the result is in a range ($I_3 \leq I \leq I_4$) in which a similar electric field (sensitivity) is obtained by adjusting the value of a voltage applied to the capillary 11, the voltage is adjusted without adjusting the position or again exchanging the capillary 11 to again measure the current value. If the electric current is again measured and then the result is acceptable, analysis is started under the conditions under which the voltage is corrected. In a case of ranges where the voltage cannot be adjusted (other than $I_3 \leq I \leq I_4$) or in a case of non-acceptable result even by re-measuring the electric current, it is determined that an error is due to the component itself. Then an action can be taken such as outputting an alert or exchanging the capillary 11 to a new capillary 11, for example. The acceptable conditions of $I_1 \leq I \leq I_2$ and $I_3 \leq I \leq I_4$ are examples, the range of acceptance may be set to a broader range or a narrower range using different conditional expressions.

Figure 18:
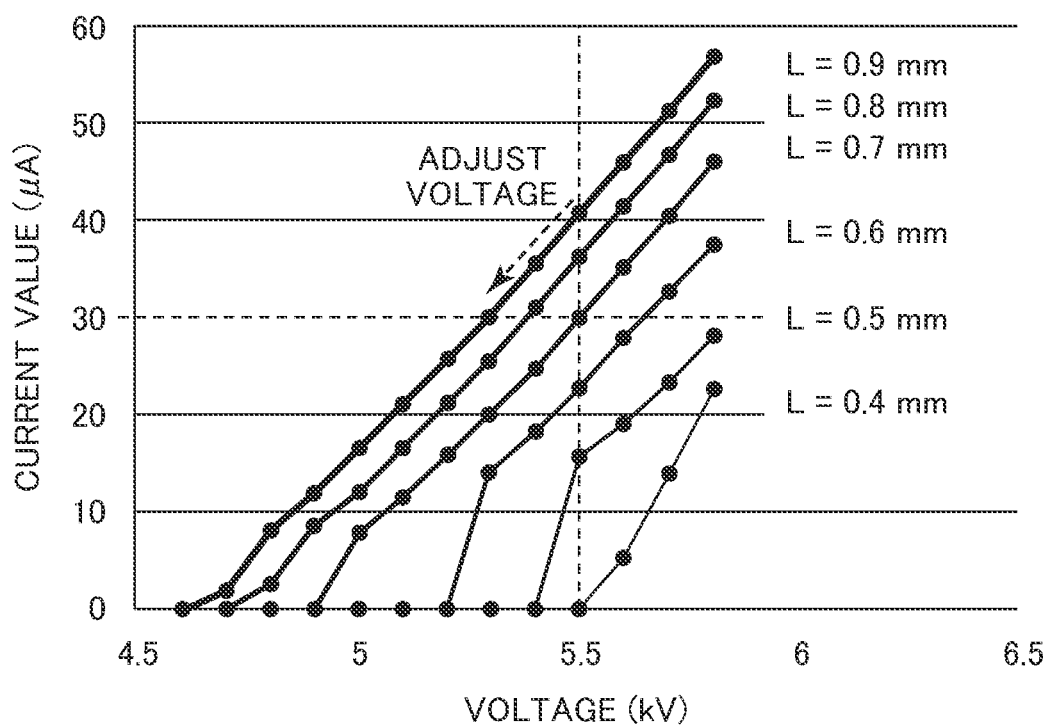
FIG. 18 is a graph that describes a range of $I_3 \leq I \leq I_4$.

FIG. 18 is a graph that describes a range of $I_3 \leq I \leq I_4$. FIG. 18 plots results in which in the configuration of FIG. 6, X is fixed to 3 mm, $Z_{neb}$ is fixed to 25 mm, and L and the voltage value are changed. The capillary 11 having an outer diameter of 0.27 mm, and a gas spray pipe 28 having a tip end inner diameter of 0.4 mm were used. The optimum conditions with this configuration are assumed that the applied voltage to the capillary 11 is 5.5 kV, and L=0.7 mm (about 30 μA). Since a power supply 33 used in experiment has an application range of 5.8 kV at the maximum, the range in which 30 μA can be achieved under conditions of increment of L=0.1 mm is the range of L=0.6 to 0.9 mm. In other words, in the configuration of L, it is considered that 30 μA can be achieved by adjusting the voltage. For example, when a result that 40 μA is obtained at an applied voltage of 5.5 kV at the first electric current measurement, it can be assumed that L=about 0.9 mm. In this case, by dropping the voltage to 5.3 kV, the electric field through which an electric current of about 30 μA is carried can be adjusted.

The corrected applied voltage at the time of analysis will be described assuming a case in which the optimum voltage is 4 kV in actual analysis. In the case in which the correlation between the horizontal axis and the vertical axis in FIG. 18 shows a tendency similar to the correlation between the applied voltage and the ionic strength at the time of analysis, in the example described above, the voltage is adjusted from 5.5 kV to 5.3 kV. Therefore, the corrected voltage at the time of analysis is set to 3.855 kV according to the ratio of voltages, and the ionic strength equivalent to the conditions of L=0.7 mm and a voltage of 4 kV can be obtained. Since the conversion formula relating to the correction also depends on the other analysis conditions and the like, the example is non-limiting.

Using the capillary exchange procedures according to the eighth embodiment, even though the position at which the capillary 11 is installed is not optimum, it is possible to adjust the position without removing the capillary 11, and thus it is possible to minimize the loss of throughput due to exchange. The method of adjusting a voltage in the eighth embodiment may be combined with the method of adjusting the position of the downstream end 12 in the other embodiments.

Ninth Embodiment

Figure 19:
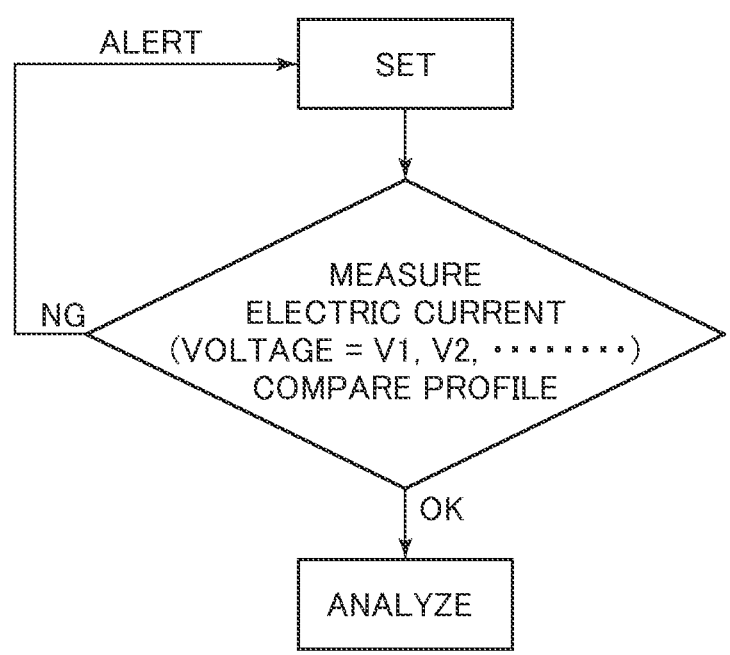
FIG. 19 is a flowchart that describes capillary exchanging procedures according to a ninth embodiment.

FIG. 19 is a flowchart that describes capillary exchanging procedures according to a ninth embodiment of the present invention. In the ninth embodiment, the profiles of current values obtained by applying a plurality of voltages is applied to a capillary 11 are compared with a reference profile, and it is determined whether the position of a downstream end 12 is acceptable. The configurations of an ion source 2 and a mass spectrometer 1 are similar to the first to the eighth embodiments.

Figure 20:
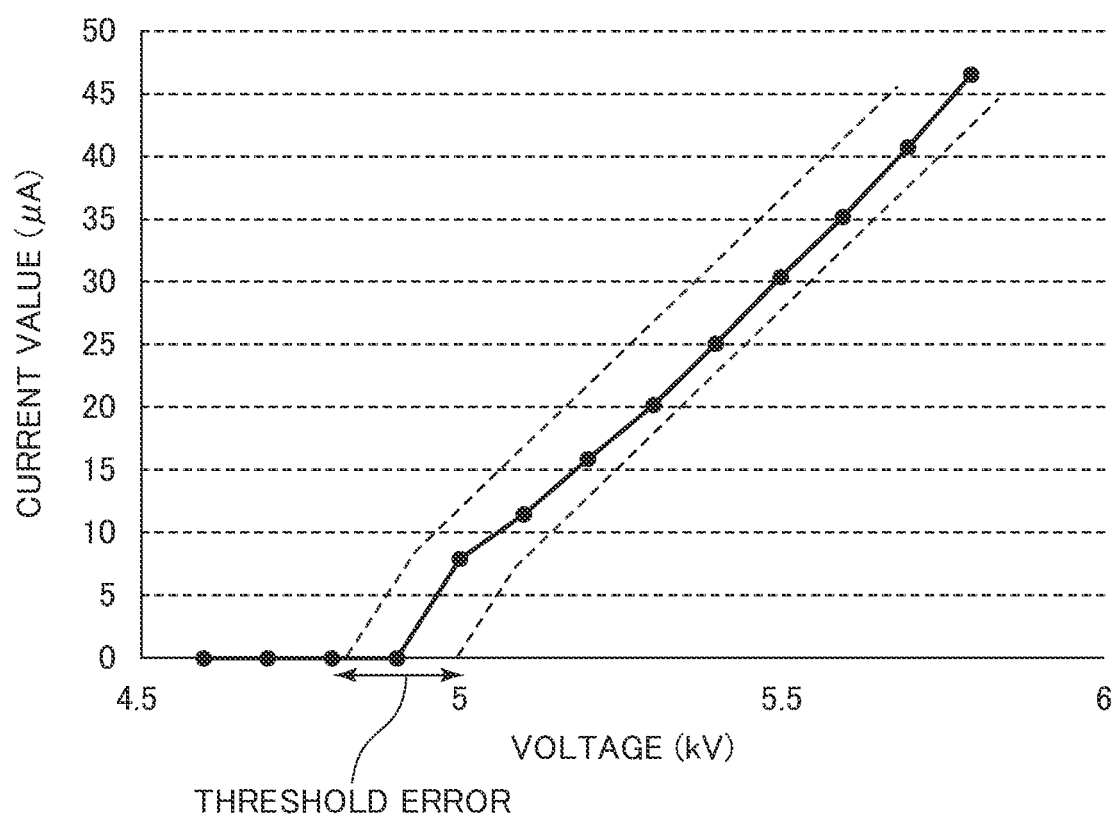
FIG. 20 is a graph showing an example that compares a reference profile with a measured result.
Figure 21:
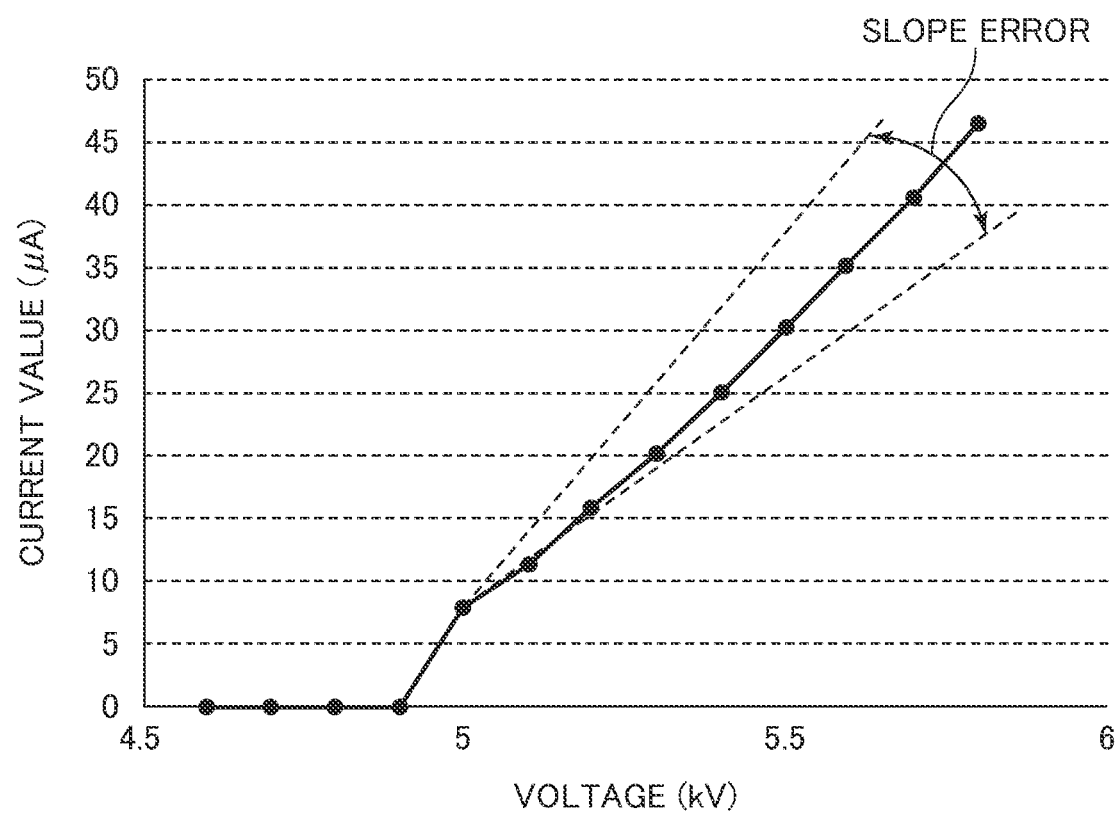
FIG. 21 is a graph showing an example that compares a reference profile with a measured result.
Figure 22:
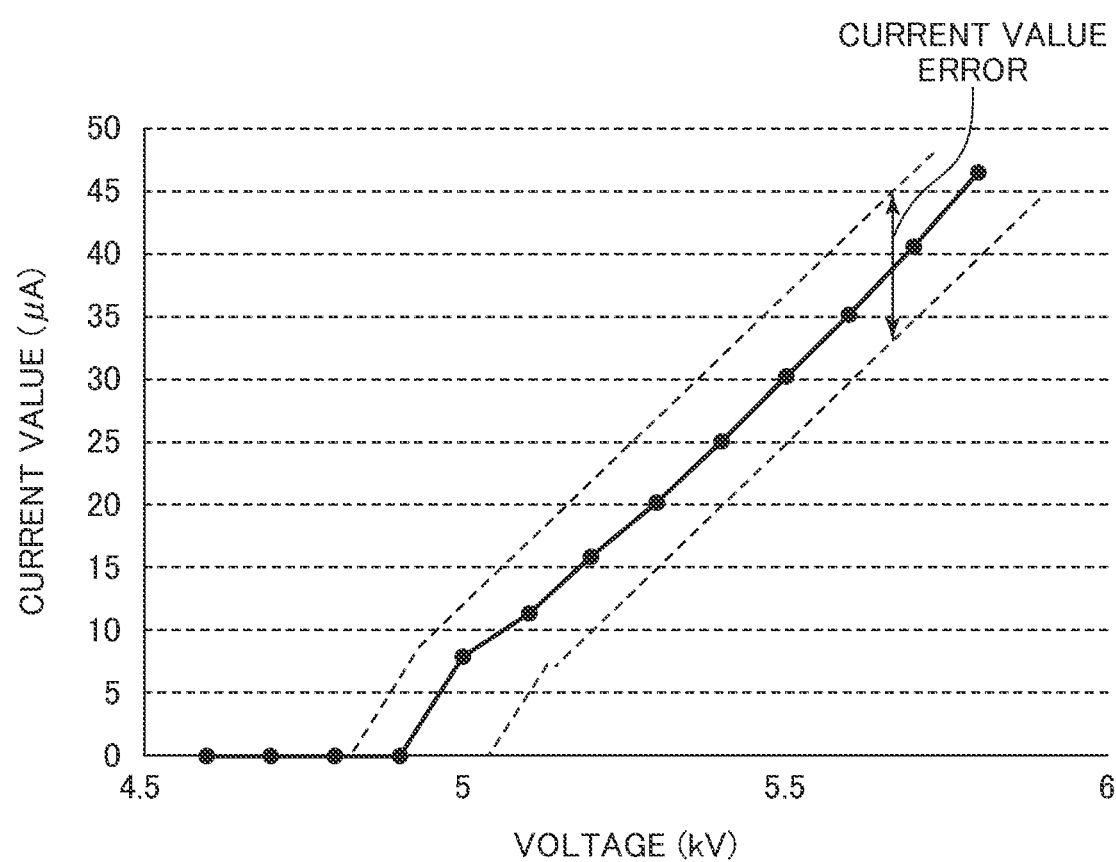
FIG. 22 is a graph showing an example that compares a reference profile with a measured result.

FIGS. 20 to 22 show an example of comparing the reference profile with measured results. When different voltages are applied to the capillary 11, profiles plotted by a solid line in FIGS. 20 to 22 are obtained. A controller 10 uses these solid lines as the reference profile. In FIG. 20, the threshold of the voltage value at which electric current measurement is feasible (a threshold voltage at which the current value rises) is varied between the reference profile and actually measured results. In FIG. 21, the slope of the current value with respect to the applied voltage is varied between the reference profile and actually measured results. In FIG. 22, the current value with respect to the same applied voltage is varied between the reference profile and actually measured results. The controller 10 sets a tolerance to errors between the reference profile and the actually measured results, and determines that the result within the tolerance is accepted, whereas determines that the result out of the tolerance is not accepted. For the determination, an indicator other than this may be used.

In accordance with the procedures according to the ninth embodiment, in comparison with the case in which one voltage is applied to the capillary 11, determination based on the current value is made more accurate. The method of comparing the reference profile with the actually measured results according to the ninth embodiment can be applied to the capillary exchanging flow in FIG. 11 or FIG. 17.

Tenth Embodiment

Figure 23:
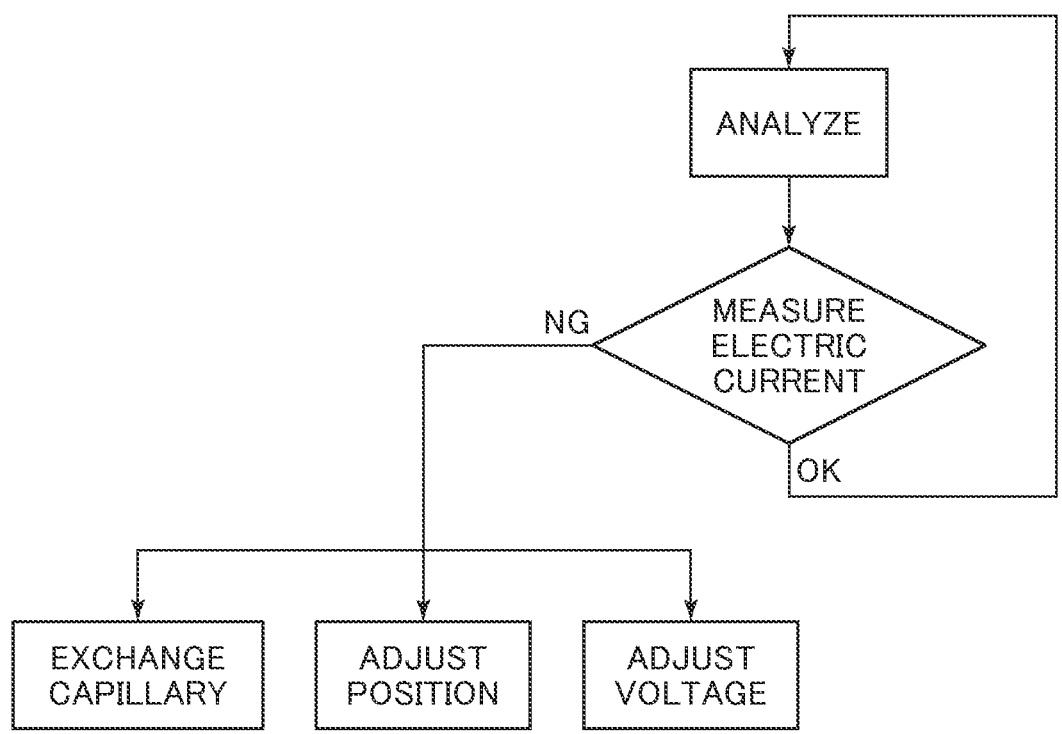
FIG. 23 is a flowchart that describes operation procedures of an ion source 2 according to a tenth embodiment.

FIG. 23 is a flowchart that describes operation procedures of an ion source according to a tenth embodiment of the present invention. An ion source 2 according to the tenth embodiment measures a current value at the time of posing analysis. When determining whether the result of measuring the current value is acceptable, the methods of the foregoing embodiments can be used. In the case in which the result is accepted, the process goes to the subsequent analysis, whereas in the case in which the result is not accepted, exchanging a capillary 11, adjusting the position, or adjusting the voltage is carried out. The methods of the foregoing embodiments may be combined.

Figure 24:
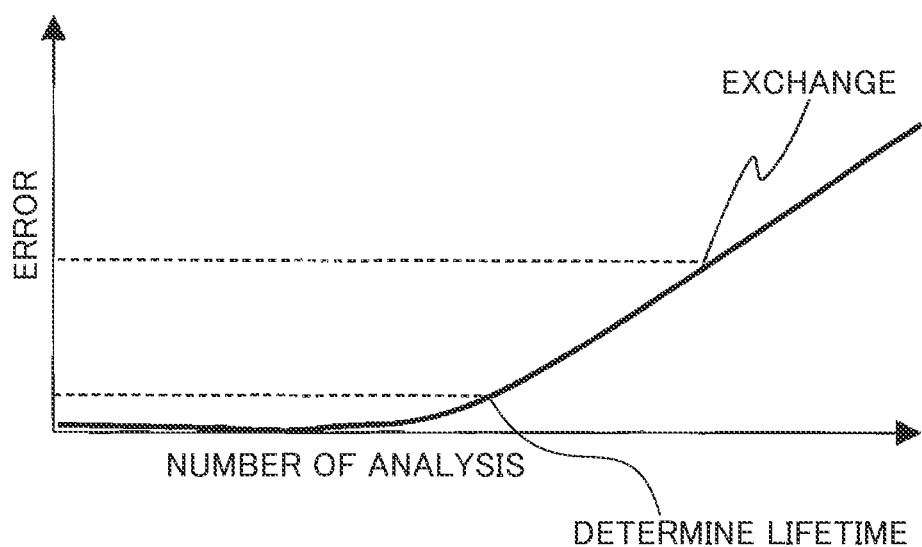
FIG. 24 is graph showing an example of a result of repeatedly measuring current values.

FIG. 24 is an example result in which current values are repeatedly measured. When current values are repeatedly measured, an analysis count-to-error curve as shown in FIG. 24 is obtained. As the error on the vertical axis, various errors shown in FIGS. 20 to 22 can be used, for example. A controller 10 can determine that the result is not accepted at the point in time at which the integrated value of errors reaches the threshold or more. Thus, it is possible to diagnose degradation of components or the signs of lifetime.

Exemplary Modifications of Present Invention

The present invention is not limited to the foregoing embodiment, and includes various exemplary modifications. For example, the foregoing embodiments are described for easily understanding the present invention, and are not necessarily limited to ones including all the described configurations. Moreover, a part of the configuration of an embodiment may be replaced with the configuration of another embodiment. Furthermore, to the configuration of an embodiment, the configuration of another embodiment may be added. In addition, in regard to a part of the configurations of the embodiments, another configuration may be added, removed, and replaced. Moreover, since a voltage is applied to various electrodes used in the embodiments, the electrodes are sometimes installed through an insulating member at the time of installation to the housing part and the like. Therefore, it should be noted that no insulator is shown in the drawings for convenience.

In the embodiments described above, the description is made in which when the power supply 9 applies a voltage to the capillary 11, the electric current carried through the electrodes is measured by the ammeter 34. However, the ammeter 34 may directly or indirectly measure the electric current carried through the capillary 11. Even in this case, it is possible to exert effects similar the embodiments. In other words, it is sufficient that when no sample is supplied to the capillary 11, the electric current produced by applying a voltage to the capillary 11 by the power supply 9 is measured.

In the embodiments described above, the controller 10 can output the projection amount information in any format. For example, the projection amount can be presented to the user through a display and the like. Alternatively, for example, data describing the projection amount may be output to another arithmetic logic unit and the like. In addition to these, an appropriate output format can be used.

In the embodiments described above, the controller 10 may be configured using hardware such as a circuit device implementing the functions of the controller 10, for example, or the controller 10 may be configured by software implementing functions of the controller 10 being executed by an arithmetic logic unit such as a CPU (Central Processing Unit).

REFERENCE SIGNS LIST

1: mass spectrometer
2: ion source
3: mass spectrometric analyzer
4: vacuum chamber
5: ion producer
6: ion source chamber
7: leading-in electrode
8: hole
9: power supply
10: controller
11: capillary
12: downstream end
13: air outlet port
14: window
15 to 17: vacuum chamber
18 to 19: hole
20 to 22: vacuum pump
23: ion transport unit
24: ion analyzer
25: detector
26: counter electrode
27: hole
28: gas spray pipe
29: downstream end
30: connector
31: sealing material
32: pipe connecting unit
33: power supply
34: ammeter
35: indicator
37: liquid chromatograph (LC)
38 to 39: pump
40: mixer
41: sample injection unit
42: separation column
43 to 44: moving phase
45: pressure gage
46: temperature adjusting unit
47: drive unit
48: drive unit
49: adapter member
50: deflection electrode
51: electric current measurement dedicated electrode
52: drive unit

What is claimed is:

1. An ion source control method that controls an ion source configured to ionize a sample,
wherein: the ion source includes
a capillary through which a liquid solution containing the sample is passed,
an ion source chamber configured to accommodate a tip end portion of the capillary,
a power supply configured to apply a voltage to the capillary, and
an ammeter configured to measure an electric current generated due to application of a voltage to the capillary by the power supply when the sample is not introduced into the capillary;
the ion source control method includes outputting projection amount information expressing whether a projection amount of the tip end portion of the capillary projecting to a space in the ion source chamber is proper; and
the outputting the projection amount information includes, when the electric current measured by the ammeter is within tolerance, outputting the projection amount information expressing that the projection amount is proper, whereas when the projection amount is not within the tolerance, outputting the projection amount information expressing that the projection amount is improper.

2. The ion source control method according to claim 1,
wherein: the ion source further includes a first drive unit configured to adjust the projection amount by moving the capillary; and
the ion source control method further includes
adjusting the projection amount by moving the capillary using the first drive unit when the electric current measured by the ammeter is not within the tolerance, and
after the projection amount is adjusted, outputting the projection amount information expressing that the projection amount is proper when the electric current measured by the ammeter is within the tolerance, and outputting the projection amount information expressing that the projection amount is improper when the projection amount is not within the tolerance.

3. The ion source control method according to claim 1,
wherein: the ion source further includes
a gas spray pipe configured to accommodate at least a part of the capillary and to inject a gas that vaporizes a substance injected from the capillary, and
a drive unit configured to adjust the projection amount by moving the gas spray pipe; and
the ion source control method further includes
adjusting the projection amount by moving the gas spray pipe using the drive unit when the electric current measured by the ammeter is not within the tolerance, and
after the projection amount is adjusted, outputting the projection amount information expressing that the projection amount is proper when the electric current measured by the ammeter is within the tolerance, and outputting the projection amount information expressing that the projection amount is improper when the projection amount is not within the tolerance.

4. The ion source control method according to claim 1, wherein: the ion source further includes
   a leading-in electrode having an introduction hole through which an ion is introduced into an analyzer configured to analyze the ion contained in the sample injected from the capillary,
   a counter electrode disposed between the leading-in electrode and the capillary and having a second introduction hole communicating with the introduction hole, and
   a gas inlet port from which a gas is ejected from the second introduction hole by introducing the gas to a space between the leading-in electrode and the counter electrode; and
the outputting the projection amount information includes, as an electric current generated by application of a voltage to the capillary by the power supply, acquiring a result of measuring an electric current carried through the counter electrode by the ammeter.

5. The ion source control method according to claim 1, wherein: the ion source further includes
   a leading-in electrode having an introduction hole through which an ion is introduced into an analyzer configured to analyze the ion contained in the sample injected from the capillary; and
the outputting the projection amount information includes, as an electric current generated by application of a voltage to the capillary by the power supply, acquiring a result of measuring an electric current carried through the leading-in electrode by the ammeter.

6. The ion source control method according to claim 1, wherein: the ion source further includes
   a leading-in electrode having an introduction hole through which an ion is introduced into an analyzer configured to analyze the ion contained in the sample injected from the capillary, and
   a deflection electrode configured to deflect the ion toward the leading-in electrode; and
the outputting the projection amount information includes, as an electric current generated by application of a voltage to the capillary by the power supply, acquiring a result of measuring an electric current carried through the deflection electrode by the ammeter.

7. The ion source control method according to claim 1, wherein: the ion source further includes
   an electric current measurement electrode operable to adjust a relative position to the tip end portion of the capillary;
the outputting the projection amount information includes, as an electric current generated by application of a voltage to the capillary by the power supply, acquiring a result of measuring an electric current carried through the electric current measurement electrode by the ammeter; and
the ion source control method further includes
   acquiring a result of measuring an electric current carried through the electric current measurement electrode by the ammeter after the electric current measurement electrode is moved to a first position when the sample is not introduced into the capillary, and
   moving the electric current measurement electrode to a second position more apart from the tip end portion of the capillary than the first position when the sample is introduced into the capillary.

8. The ion source control method according to claim 1, wherein: the ion source control method further includes
changing a voltage applied to the capillary by the power supply when the electric current measured by the ammeter is not within the tolerance and within a second tolerance, and
after the voltage applied to the capillary by the power supply is changed, controlling the power supply such that the changed voltage is applied to the capillary when the electric current measured by the ammeter is within the tolerance, and outputting the projection amount information expressing that the projection amount is improper when the projection amount is not within the tolerance.

9. The ion source control method according to claim 8, wherein the ion source control method further includes
outputting the projection amount information expressing that the projection amount is improper when the electric current measured by the ammeter is not within the tolerance and not within the second tolerance.

10. The ion source control method according to claim 1, wherein: the ion source further includes
   a storage unit configured to store correspondence data acquired by measuring beforehand a correspondence between a voltage applied to the capillary by the power supply and an electric current measured by the ammeter; and
the ion source control method further includes
   outputting the projection amount information expressing that the projection amount is proper when an error between the correspondence data and actually measured data describing an actually measured result of a correspondence between a voltage applied to the capillary by the power supply and an electric current measured by the ammeter is within a third tolerance, and outputting the projection amount information expressing that the projection amount is improper when the error is within the third tolerance.

11. The ion source control method according to claim 10, wherein as the error, a difference between the actually measured data and the correspondence data is acquired on at least any of
a threshold voltage at which an electric current measured by the ammeter raises from zero,
a slope of an electric current measured by the ammeter with respect to a voltage applied to the capillary by the power supply, or
an electric current measured by the ammeter with respect to a voltage value which is same as that of being applied to the capillary by the power supply.

12. An ion source that ionizes a sample, the ion source comprising:
   a capillary through which a liquid solution containing the sample is passed;
   an ion source chamber configured to accommodate a tip end portion of the capillary;
   a power supply configured to apply a voltage to the capillary;
   an ammeter configured to measure an electric current generated due to application of a voltage to the capillary by the power supply when the sample is not introduced into the capillary; and a computation unit configured to output projection amount information expressing whether a projection amount of the tip end portion of the capillary projecting to a space in the ion source chamber is proper, wherein the computation unit outputs the projection amount information expressing that the projection amount is proper when the electric current measured by the ammeter is within tolerance, and outputs the projection amount information expressing that the projection amount is improper when the projection amount is not within the tolerance.

13. A mass spectrometer comprising the ion source according to claim 12.

* * * * *